United States Patent
Ishikawa et al.

(10) Patent No.: US 7,083,091 B2
(45) Date of Patent: Aug. 1, 2006

(54) COMMODITY INFORMATION MANAGEMENT PROGRAM, COMPUTER READABLE MEDIUM STORING THE PROGRAM, AND DATA STRUCTURE OF COMMODITY CLASSIFICATION MASTER DATABASE USED BY THE PROGRAM

(75) Inventors: Ryuta Ishikawa, Bunkyo (JP); Naoki Yamada, Bunkyo (JP)

(73) Assignee: Fujitsu Limited, Kawasaki (JP)

( * ) Notice: Subject to any disclaimer, the term of this patent is extended or adjusted under 35 U.S.C. 154(b) by 162 days.

(21) Appl. No.: 10/785,153

(22) Filed: Feb. 25, 2004

(65) Prior Publication Data
US 2005/0067491 A1  Mar. 31, 2005

(30) Foreign Application Priority Data
Sep. 30, 2003  (JP) .............................. 2003-341303

(51) Int. Cl.
 *G06K 15/00* (2006.01)
(52) U.S. Cl. ...................... 235/383; 235/376; 235/385; 705/28; 707/1
(58) Field of Classification Search ................ 235/383, 235/376
See application file for complete search history.

(56) References Cited

U.S. PATENT DOCUMENTS
6,944,618 B1 * 9/2005 Smith .......................... 707/100
2004/0041022 A1 * 3/2004 Minowa et al. .............. 235/383

FOREIGN PATENT DOCUMENTS
JP  11-7587  1/1999

* cited by examiner

*Primary Examiner*—Seung H Lee
(74) *Attorney, Agent, or Firm*—Staas & Halsey LLP

(57) ABSTRACT

In a commodity classification master database for managing commodity classification codes, records containing a commodity classification code showing a current attribute, the level number showing a level of the current attribute in hierarchical structure of attributes and a parent code showing a commodity classification code of the parent code showing the attribute in the immediately higher level defining a broader sense than the current attribute are accumulated. Accepting a commodity classification code and a parent code, a management computer adds a record containing these codes to the commodity classification master database according to a management program.

4 Claims, 23 Drawing Sheets

FIG.2

| Level number | Commodity classification code | Commodity classification name | Parent code |
|---|---|---|---|
| 1 | KADEN | Consumer electronics | |
| 2 | A000 | Rice cooker | KADEN |
| 3 | 0001 | IH heat | A000 |
| 3 | 0002 | Heater heat | A000 |
| 2 | B000 | Video recorder | KADEN |
| 3 | 0001 | VHS | B000 |
| 3 | 0002 | DVD | B000 |
| 3 | 0003 | Hard Disk | B000 |

Commodity classification master database 11

FIG.3

| Commodity model number | Commodity code |
|---|---|
| FJ-0001 | KADEN:A000:0001 |
| FJ-0002 | KADEN:A000:0002 |
| FJ-0003 | KADEN:A000:0002 |
| FJVPT5 | KADEN:B000:0001 |
| FJVPT7 | KADEN:B000:0002 |
| FJVPT9 | KADEN:B000:0003 |

Commodity master database 12

Top-level information input screen

Top-level information check screen

FIG.9

| Level number | Commodity classification code | Commodity classification name | Parent code |
|---|---|---|---|
| 1 | KADEN | Consumer electronics | |
| 2 | A000 | Rice cooker | KADEN |
| 3 | 0001 | IH heat | A000 |
| 3 | 0002 | Heater heat | A000 |
| 2 | B000 | Video recorder | KADEN |
| 3 | 0001 | VHS | B000 |
| 3 | 0002 | DVD | B000 |
| 3 | 0003 | Hard Disk | B000 |
| 1 | FOOD | Foods | |

Commodity classification master database 11 after addition in top level

FIG.12

Correct information about commodity classification.   —41

| Parent commodity classification name | Consumer electronics |
|---|---|
| Level number | 2 |
| Commodity classification code | KADEN - C000  —41a |
| Commodity classification name | Rice cooker  —41b |

41c    41d    41e

Check    Cancel    Back

Correction input screen

FIG.13

Check information about correction of commodity classification   —42

| Parent commodity classification name | Consumer electronics |
|---|---|
| Level number | 2 |
| Commodity classification code | KADEN-C000 |
| Commodity classification name | Rice cooker |

42a    42b

Register    Revise

Correction check screen

FIG.14

| Level number | Commodity classification code | Commodity classification name | Parent code |
|---|---|---|---|
| 1 | KADEN | Consumer electronics | |
| 2 | C000 | Rice cooker | KADEN |
| 3 | 0001 | IH heat | C000 |
| 3 | 0002 | Heater heat | C000 |
| 2 | B000 | Video recorder | KADEN |
| 3 | 0001 | VHS | B000 |
| 3 | 0002 | DVD | B000 |
| 3 | 0003 | Hard Disk | B000 |

Commodity classification master database 11 after correction of commodity classification

FIG.15

| Commodity model number | Commodity code |
|---|---|
| FJ-0001 | KADEN:C000:0001 |
| FJ-0002 | KADEN:C000:0002 |
| FJ-0003 | KADEN:C000:0002 |
| FJVPT5 | KADEN:B000:0001 |
| FJVPT7 | KADEN:B000:0002 |
| FJVPT9 | KADEN:B000:0003 |

Commodity master database 12 after correction of commodity classification

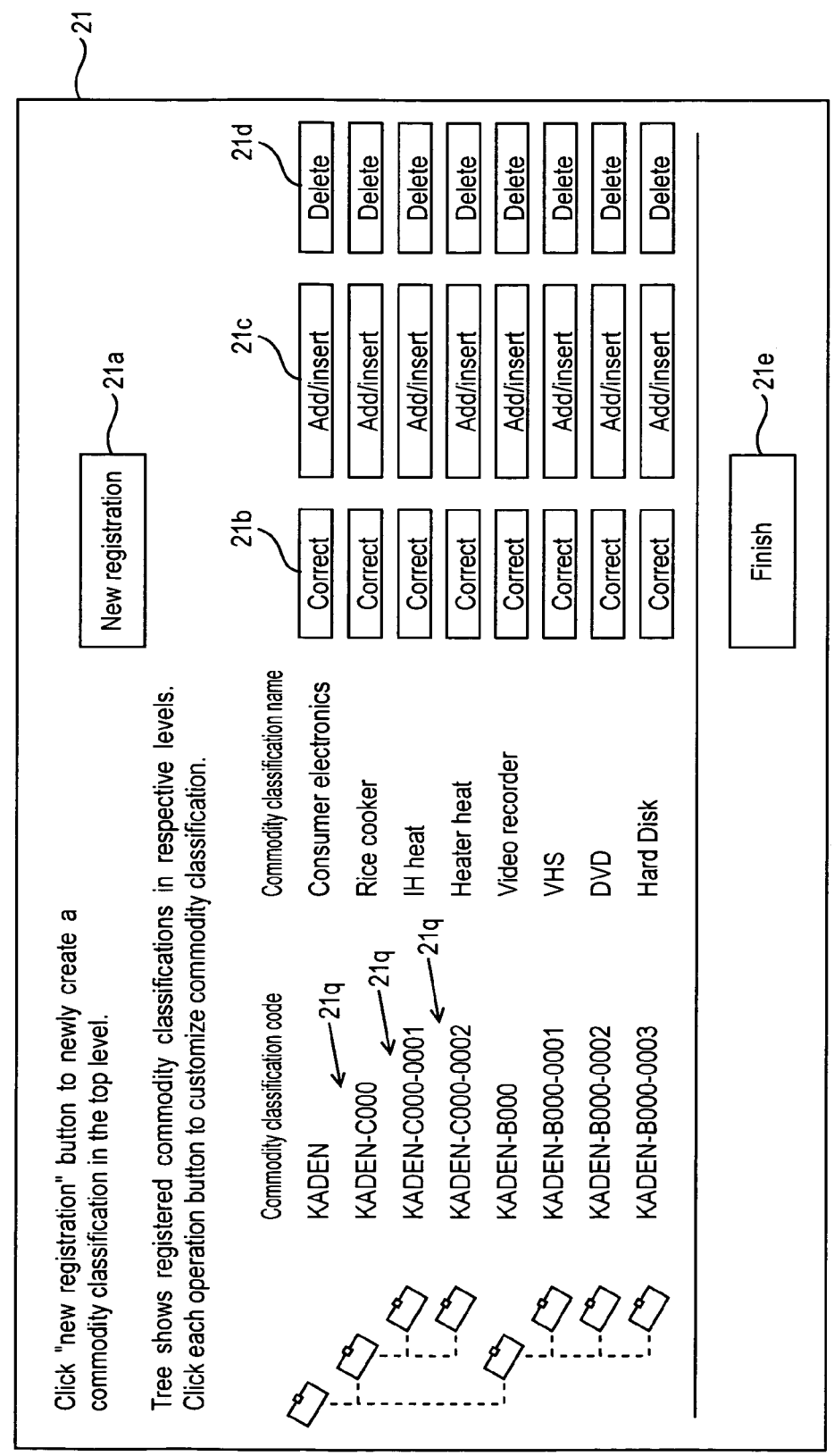

FIG.18

Input information about newly inserted commodity classification in the level lower than the level 3.  ⎯51

| Parent commodity classification name | VHS |
|---|---|
| Level number | 4 |
| Commodity classification code | KADEN-B000-0001-[ ABAB ] ⎯51a |
| Commodity classification name | [ With satellite receiver ] ⎯51b |

51c [Check]    51d [Cancel]    51e [Back]

Bottom-level information input screen

FIG.19

Check information about newly inserted commodity classification in the level lower than the level 3.  ⎯52

| Parent commodity classification name | VHS |
|---|---|
| Level number | 4 |
| Commodity classification code | KADEN-B000-0001-ABAB |
| Commodity classification name | With satellite receiver |

52a [Register]    52b [Revise]

Bottom-level information check screen

FIG.20

| Level number | Commodity classification code | Commodity classification name | Parent code |
|---|---|---|---|
| 1 | KADEN | Consumer electronics | |
| 2 | A000 | Rice cooker | KADEN |
| 3 | 0001 | IH heat | A000 |
| 3 | 0002 | Heater heat | A000 |
| 2 | B000 | Video recorder | KADEN |
| 3 | 0001 | VHS | B000 |
| 3 | 0002 | DVD | B000 |
| 3 | 0003 | Hard Disk | B000 |
| 4 | ABAB | With satellite receiver | 0001 |

Commodity classification master database 11 after addition in bottom level

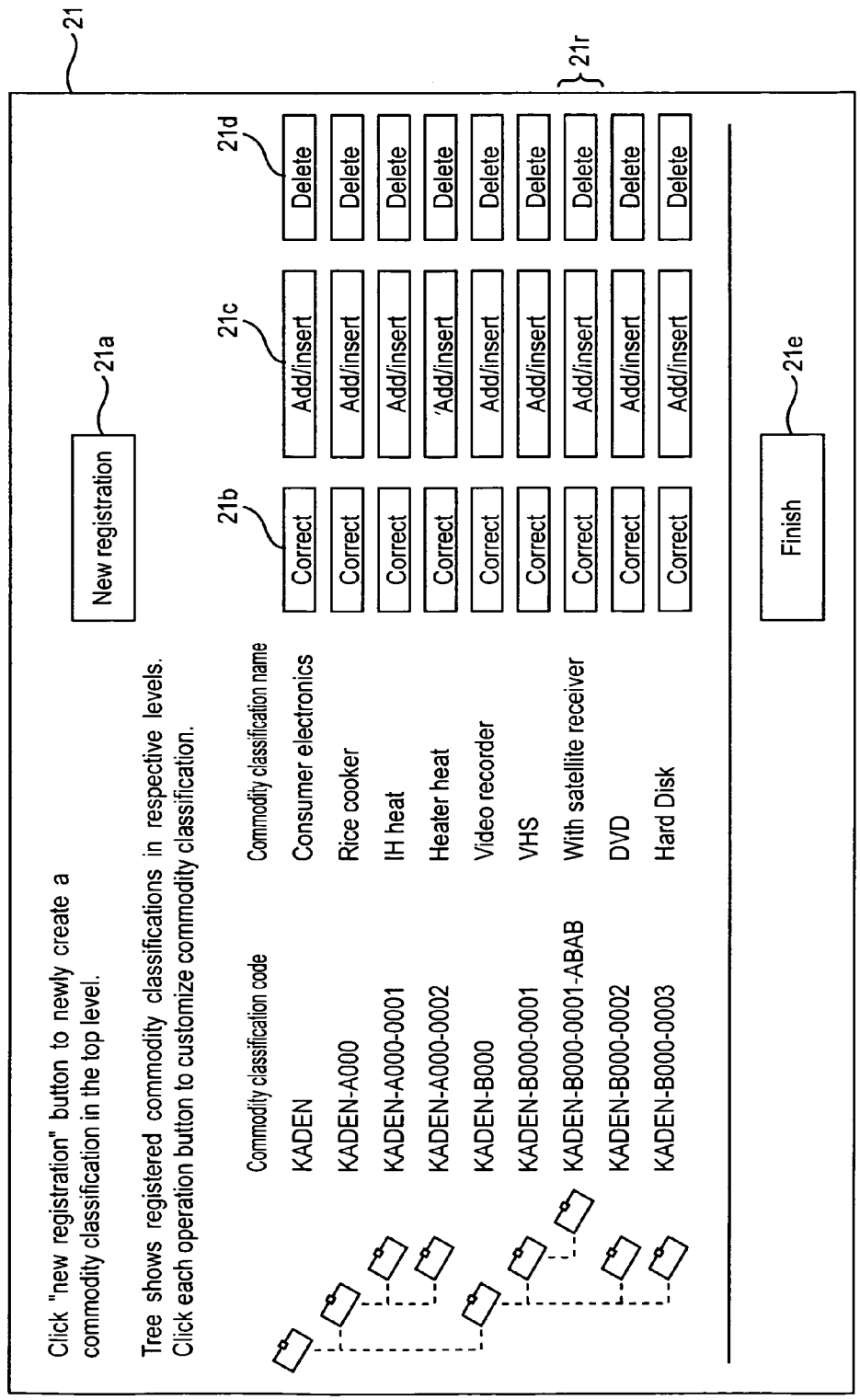

FIG.22

Input information about commodity classification inserted in the level immediately lower than this level.

| Parent commodity classification name | Video recorder |
|---|---|
| Level number | 3 |
| Commodity classification code | KADEN-B000-ABAB  ~61a |
| Commodity classification name | With satellite receiver  ~61b |

Following commodity classifications are dependent on this level 2. Click check box to make commodity classification be dependent on newly inserted commodity classification.

|  | Commodity classification code | Commodity classification name |
|---|---|---|
| 61c ☑ | KADEN-B000-0001 | VHS |
| 61c ☑ | KADEN-B000-0002 | DVD |
| 61c ☐ | KADEN-B000-0003 | Hard Disk |

61d [Check]   61e [Cancel]   61f [Back]

Insertion input screen

FIG.23

Check information about commodity classification inserted in the level immediately lower than level 2. ~62

| Parent commodity classification name | Video recorder |
|---|---|
| Level number | 3 |
| Commodity classification code | KADEN-B000-ABAB |
| Commodity classification name | With satellite receiver |

Moving back commodity classification(s)

| Old commodity classification code | New commodity classification code | Commodity classification name |
|---|---|---|
| KADEN-B000-0001 | KADEN-B000-ABAB-0001 | VHS |
| KADEN-B000-0002 | KADEN-B000-ABAB-0002 | DVD |

62a  62b

[Register]  [Revise]

Insertion check screen

FIG.24

| Level number | Commodity classification code | Commodity classification name | Parent code |
|---|---|---|---|
| 1 | KADEN | Consumer electronics | |
| 2 | A000 | Rice cooker | KADEN |
| 3 | 0001 | IH heat | A000 |
| 3 | 0002 | Heater heat | A000 |
| 2 | B000 | Video recorder | KADEN |
| 4 | 0001 | VHS | ABAB |
| 4 | 0002 | DVD | ABAB |
| 3 | 0003 | Hard Disk | B000 |
| 3 | ABAB | With satellite receiver | B000 |

Commodity classification master database 11 after insertion of commodity classification

FIG.25

| Commodity model number | Commodity code |
|---|---|
| FJ-0001 | KADEN:A000:0001 |
| FJ-0002 | KADEN:A000:0002 |
| FJ-0003 | KADEN:A000:0002 |
| FJVPT5 | KADEN:B000:ABAB:0001 |
| FJVPT7 | KADEN:B000:ABAB:0002 |
| FJVPT9 | KADEN:B000:0003 |

Commodity master database 12 after insertion of commodity classification

Deletion-impossible warning screen

Deletion check screen

| Level number | Commodity classification code | Commodity classification name | Parent code |
|---|---|---|---|
| 1 | KADEN | Consumer electronics | |
| 2 | 0001 | IH heat | KADEN |
| 2 | 0002 | Heater heat | KADEN |
| 2 | B000 | Video recorder | KADEN |
| 3 | 0001 | VHS | B000 |
| 3 | 0002 | DVD | B000 |
| 3 | 0003 | Hard Disk | B000 |

Commodity classification master database 11 after deletion of commodity classification Main screen after deletion of commodity classification

US 7,083,091 B2

COMMODITY INFORMATION MANAGEMENT PROGRAM, COMPUTER READABLE MEDIUM STORING THE PROGRAM, AND DATA STRUCTURE OF COMMODITY CLASSIFICATION MASTER DATABASE USED BY THE PROGRAM

BACKGROUND OF THE INVENTION

1. Field of the Invention

The present invention relates to a commodity information management program for managing commodity information with using commodity classification codes, a computer readable medium that stores the program and a data structure of a commodity classification master database handled by the program.

2. Prior Art

As well known, commodity classification codes are employed to retrieve commodity information effectively. The commodity classification code is information that shows the attribute of the commodity, and the same commodity classification code is given to the commodity information of commodities having the same attribute.

Further, there are large and small concepts for the attribute. An attribute of a large concept contains an attribute of a small concept. For example the attribute of "noodle" contains the attributes of "soba", "udon", "Chinese noodle" and "spaghetti". Therefore, a commodity classification code showing an attribute of a low-level concept belongs to a commodity classification code of a high-level concept. As a result, the commodity classification code constructs a code system having a tree-type hierarchical structure as a whole, and the number of the commodity classification codes applied to the commodity information is equal to the number of the attributes applied to the commodity.

In recent years, software packages for managing commodity information using such a commodity classification code have been developed by software venders, and the packages are mainly sold to users, such as a retailer and an electronic commerce contractor.

This kind of software package is generally provided with three commodity classification master databases for a high level, a middle level and a low level. A user is able to create the code system having the three-layer construction by registering commodity classification codes that are originally defined by a user to the respective databases.

Further, this kind of software package is provided with a commodity master database that defines correspondence between commodity information about a commodity treated by a user and three commodity classification codes for a high level, a middle level and a low level with respect to the commodity.

When a user designates three commodity classification codes of the high, middle and low levels and executes a search with the commodity classification codes as a search condition on a computer on which the software package is running, the user can extract only the commodity information about the commodity having the attributes corresponding to the designated commodity classification codes. Therefore, a user can extract commodity information efficiently as compared with a method by searching commodity information simply.

However, according to the conventional software package described above, the levels of the commodity classification code could not be larger than three. For this reason, a large-scale retailer such as a department store needed to reconstruct the database system such that a code system of four or more levels can be created with great expense.

Further, according to the conventional software package described above, a code devoid of meaning had to be set in the third level for commodities that requires two levels of the commodity classification codes only.

Still further, when a user moves a certain commodity classification code to another level, a user had to update a plurality of commodity classification code master databases and had to rewrite the commodity classification code in the commodity master database. Therefore, maintenance of the commodity classification code requires extremely large effort. Moreover, a failure of maintenance causes mismatch between the commodity classification code and the commodity information.

SUMMARY OF THE INVENTION

It is therefore an object of the present invention to provide an improved commodity information management program, which is capable of customizing a part of a code system of the commodity classification code with easy operations so as to easily keep a matching between the commodity information and the commodity classification code. Further, the present invention aims to provide a computer readable medium that stores the program and a data structure of a commodity classification master database handled by the program.

For the above object, a first aspect of the commodity information management program according to the present invention controls a computer to be operated as equipment including first storage that stores a database for defining various attributes, which form a hierarchical structure, of respective commodities, the database including records each of which has fields of a commodity classification code containing the code information about the current attribute, a level number containing a level of the current attribute in the hierarchical structure and a parent code containing a commodity classification code of the parent attribute in the immediately higher level defining a broader sense than the current attribute; a first accepting portion that accepts information designating the commodity classification code and the parent code through an input device; and an adding portion that adds a record having the commodity classification code and the parent code accepted by the first accepting portion to the first storage as an addition record.

With this construction, a user can easily register a commodity classification code, which defines an attribute in any level, into the first storage by designating the commodity classification code to be added and its parent code only.

A second aspect of the commodity information management program according to the present invention controls a computer to be operated as equipment including first storage that stores a database for defining various attributes, which form a hierarchical structure, of respective commodities, the database including records each of which has fields of a commodity classification code containing the current attribute, a level number containing a level of the current attribute in the hierarchical structure and a parent code containing a commodity classification code showing the parent attribute in the immediately higher level defining a broader sense than the current attribute; a third accepting portion that accepts information designating the commodity classification code through an input device; a deleting portion that deletes the records containing the commodity classification code accepted by the third accepting portion as deletion record from the first storage; a discriminating portion that discriminates whether there is a moving-up target record in the first storage whose parent code is coincident with the commodity classification code in the deletion record; and a moving-up portion that replaces the parent code in the moving-up target record with the parent code in the deletion record, decrements the level number in the moving-up target record by one, and decrements the level numbers in the records that define attributes in lower level defining a narrower sense than that in the moving-up target record by one, respectively when the discriminating portion discriminated that there is the moving-up target record in the first storage.

With this construction, a user can easily delete a commodity classification code from the first storage by designating the commodity classification code to be deleted only. Moreover, if there are any commodity classification codes that define attributes in lower level defining a narrower sense than the deleted commodity classification code, the levels of these commodity classification codes can be automatically incremented by one.

According to the commodity information management program of the first or second aspect, a user can add or delete a commodity classification code by operating only one database, but no need to operate a plurality of databases. Further, a user can freely increase or decrease the number of levels of the commodity classification. That is, the number of levels may be smaller than or larger than three. Therefore, the present invention enables to customize a part of the code system of the commodity classification code with an easy operation.

Further, the commodity information management program of the first aspect of the present invention may make a user designate one of the records that define attributes in the same level as the attribute of the commodity classification code to be added as a moving-back target record belonging to the addition commodity classification record. In this case, the moving-back target record will be updated to store the commodity classification code of the addition record as the parent code and to increment the level number by one. Moreover, the level numbers in the records belonging to the moving-back target record are incremented by one, respectively.

Still further, the commodity information management program of the second aspect of the present invention may discriminate whether there is a moving-up target record whose parent code is coincident with the commodity classification code in the deletion record. In this case, the moving-up target record will be updated to replace the parent code thereof with the parent code in the deletion record, and decrements the level number in the moving-up target record by one. Moreover, the level numbers in the records belonging to the moving-up target record are decremented by one, respectively.

Yet further, the data structure of the commodity classification master database handled by the commodity information management programs of the first and second aspects of the present invention is constructed as follows.

The data structure of a commodity classification master database for defining various attributes, which form a hierarchical structure, of respective commodities includes a commodity classification code that shows the current attribute; a level number that shows a level of the current attribute in the hierarchical structure; and a parent code that shows a commodity classification code showing the parent attribute in the immediately higher level defining a broader sense than the current attribute.

With this structure, a user can select a commodity code to be added or deleted with using the parent code and the level number of the commodity classification code to be added or deleted. Then, a user can add or delete the commodity classification code to be added or deleted with respect to the selected commodity code.

Since a record for defining a commodity classification code also includes a level number and a parent code, a commodity classification code can be easily add to or delete from a commodity code. Therefore, a matching between the commodity information and the commodity classification code can be easily kept even if a part of the code system of the commodity classification code is customized.

According to the present invention, a user can customize a part of the code system of the commodity classification code with easy operations, and thus, a matching between the commodity information and the commodity classification code can be easily after the operations.

DESCRIPTION OF THE ACCOMPANYING DRAWINGS

FIG. 2 shows a data structure of a commodity classification master database;

FIG. 3 shows a data structure of a commodity master database;

FIG. 9 shows a data structure of the commodity classification master database after a commodity classification is added in the top level;

FIG. 12 shows one example of a correction input screen;

FIG. 13 shows one example of a correction check screen;

FIG. 14 shows a data structure of the commodity classification master database after information about one commodity classification is corrected;

FIG. 15 shows a data structure of the commodity master database after information about one commodity classification is corrected;

FIG. 16 shows one example of the main screen after information about one commodity classification is corrected;

FIG. 18 shows one example of a bottom-level information input screen;

FIG. 19 shows one example of a bottom-level information check screen;

FIG. 20 shows a data structure of the commodity classification master database after a commodity classification is added to the bottom level;

FIG. 21 shows one example of the main screen after a commodity classification is added to the bottom level;

FIG. 22 shows one example of an insertion input screen;

FIG. 23 shows one example of an insertion check screen;

FIG. 24 shows a data structure of the commodity classification master database after a commodity classification is added to a middle level;

FIG. 25 shows a data structure of the commodity master database after a commodity classification is added in the middle level;

DESCRIPTION OF THE PREFERRED EMBODIMENTS

Hereinafter, an embodiment of the present invention will be described with reference to drawings.

Figure 1:
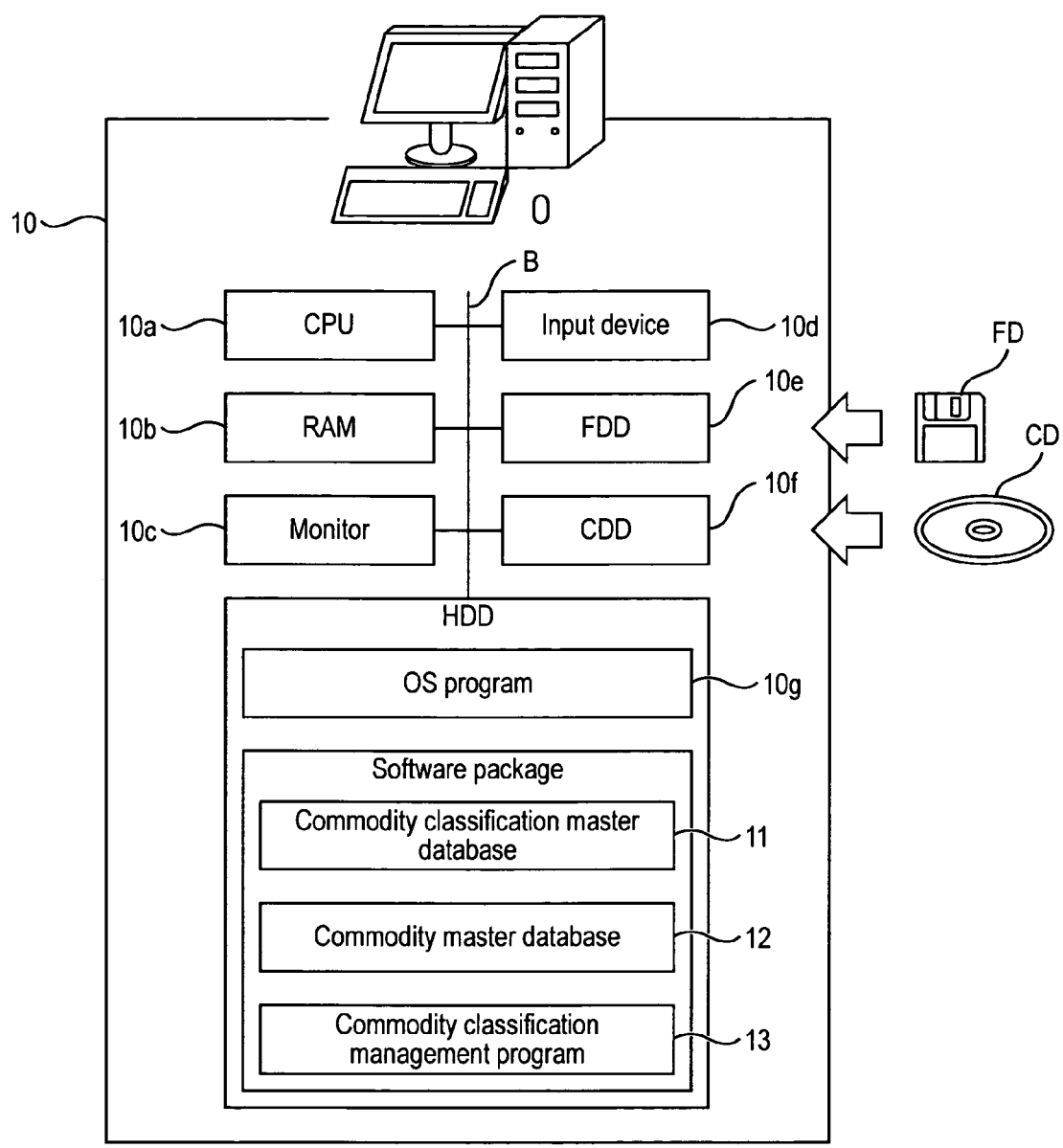
FIG. 1 is a block diagram showing a commodity information management apparatus according to an embodiment.

FIG. 1 is a block diagram for showing a commodity information management apparatus 10 of the embodiment. The commodity information management apparatus 10 is provided with a CPU (Central Processing Unit) 10a, a RAM (Random Access Memory) 10b, a monitor 10c, an input device 10d, an FDD (Flexible Disk Drive) 10e, a CDD (Compact Disk Drive) 10f and an HDD (Hard Disk Drive) 10g. These hardware components are connected with one another through a bus B.

The CPU 10a is a central processing device that controls the entire system of the commodity information management apparatus 10. The RAM 10b is a main memory on which a work area is developed when the CPU 10a executes various programs.

The monitor 10c displays various screens based on the screen data created by the CPU 10a, specifically, it is a CRT (Cathode-Ray Tube) display or an LCD (Liquid Crystal Display). The input device 10d accepts input by an operator, specifically, it includes a keyboard, a mouse and a touch screen.

The FDD 10e and the CDD 10f are auxiliary memories that read/write data and program from/to a computer readable medium such as a flexible disk FD and a compact disk CD.

The HDD 10g is an auxiliary memory that is built in or externally attached to the commodity information management apparatus 10, and it stores various programs that are read to the RAM 10b and executed by the CPU 10a. The HDD 10g stores a software package in addition to an OS (Operation System) program that totally controls the software and hardware.

The software package implements the function for managing information about commodities of a retailer who sells various kinds of commodities to customers at a real or virtual shop on a computer. This software package is read from a computer readable medium by the FDD 10e and the CDD 10f and is installed into the HDD 10g.

The software package consists of many programs that implement various functions to manage the information about commodities on a computer and many kinds of data. At least a commodity classification master database 11, a commodity master database 12 and a commodity classification management program 13 are included in the software package as parts related to the present invention.

The commodity classification master database 11 stores the information about commodity classification for retailers who classify and manage the information about their handled commodities. FIG. 2 shows a data structure of the commodity classification master database 11. The number of records included in the commodity classification master database 11 shown in FIG. 2 is equal to the number of attributes of the commodities that are defined by retailers to classify the respective commodities. Each record has fields of "level number", "commodity classification code", "commodity classification name" and "parent code".

The level number that shows an ordinal rank of the level defined for the current attribute corresponding to the conceptual size of the current attribute is recorded in the "level number" field. The commodity classification code that is code information to identify the current attribute uniquely from all the attributes is recorded in the "commodity classification code" field. The name of the current attribute is recorded in the "commodity classification name" field. The parent code that is the commodity classification code of the parent attribute in the immediately higher level is recorded in the "parent code" field. If there is no parent attribute, the "parent code" field will be blank.

The commodity master database 12 stores information about commodities that are handled by retailers. FIG. 3 shows the data structure of the commodity master database 12. The number of records included in the commodity master database 12 shown in FIG. 3 is equal to the number of kinds of the commodities that are handled by a retailer. Each record has fields of "commodity model number" and "commodity code".

The model number of each commodity handled by a retailer is recorded in the "commodity model number" field. The commodity code that consists of the commodity classification codes of the commodity in the respective levels is recorded in the "commodity code" field.

In general, the commodity master database stores a commodity name, a commodity model number, price, a manufacture name, a commodity code and other information about a commodity. However, the information other than the commodity model number and the commodity code will not be described in the embodiment.

The commodity classification management program 13 manages the records stored in the commodity classification master database 11 and the commodity code in the commodity master database 12. The contents of the process executed by the CPU 10a according to the commodity classification management program 13 will be described below.

A person in charge in a retailer starts a predetermined program in the software package by operating the input device 10d of the commodity information management apparatus 10 in order to manage the commodity information. Then, a predetermined menu screen is displayed on the monitor 10c of the commodity information management apparatus 10.

Figure 4:
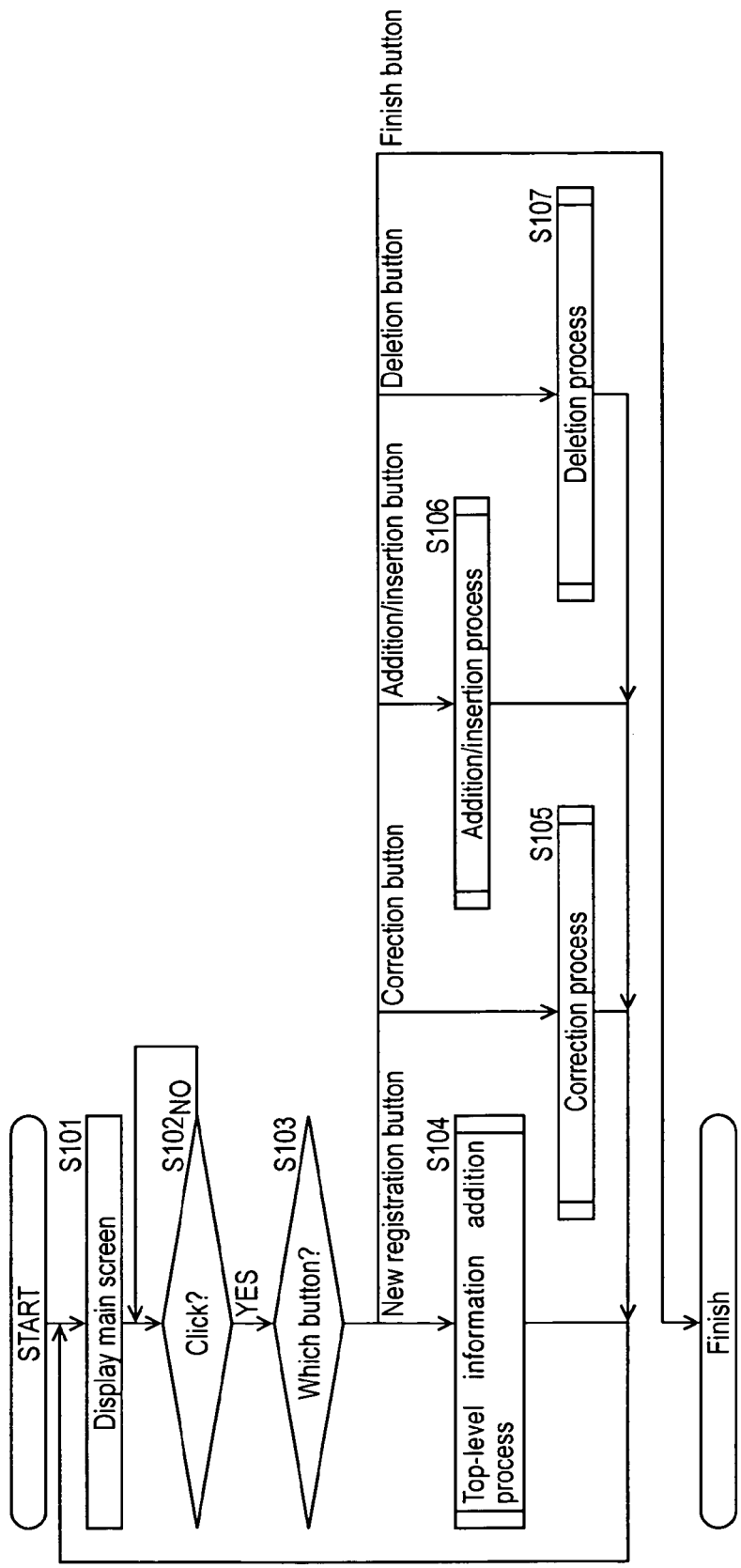
FIG. 4 is a flowchart for explaining the contents of a commodity classification management process.

Further, when the person in charge of the retailer intends to manage the commodity classification, he or she can click a predetermined button in the menu screen displayed on the monitor 10c by operating the input device 10d. Then, the CPU 10a reads the commodity classification management program 13 from the HDD 10g and starts the process to manage the commodity classification. FIG. 4 is a flowchart showing the contents of this process.

At a first step S101 after the process starts, the CPU 10a executes the process to display a main screen for the commodity classification management on the monitor 10c. Specifically, at step S101, the CPU 10a reads the respective records from the commodity classification master database 11 and writes the read records on a worktable. However, the CPU 10a does not read the record from the commodity classification master database 11 in the order of accumulation. In the commodity classification master database 11, the record may not be accumulated in the order of the level number. For example, if the record whose "level number" field stores "2" and "commodity classification name" field stores "rice cooker" is accumulated under the record whose "level number" field stores "3" and "commodity classification name" field stores "hard disc", the records are not accumulated in the order of the level number.

Since the data structure of the commodity classification master database 11 allows such an accumulation of records without regard to the relationship of the levels, the CPU 10a reads the records from the commodity classification master database 11 and writes the records on the worktable by repeating the process described as follows.

That is, when the CPU 10a reads a record of a predetermined commodity classification in a predetermined level, the CPU 10a sequentially reads the records whose commodity classifications are dependent on the predetermined commodity classification. After all the records of the dependent commodity classifications have been read, the CPU 10a starts to read a record of a different commodity classification in the predetermined level.

Further, during this process, the CPU 10a attaches all the commodity classification codes in the levels higher than the level of the record to the commodity classification code at the timing When the CPU 10a writes the record on the worktable. Therefore, each record in the worktable has the "commodity classification code chain" field instead of the "commodity classification code" field.

Figure 5:
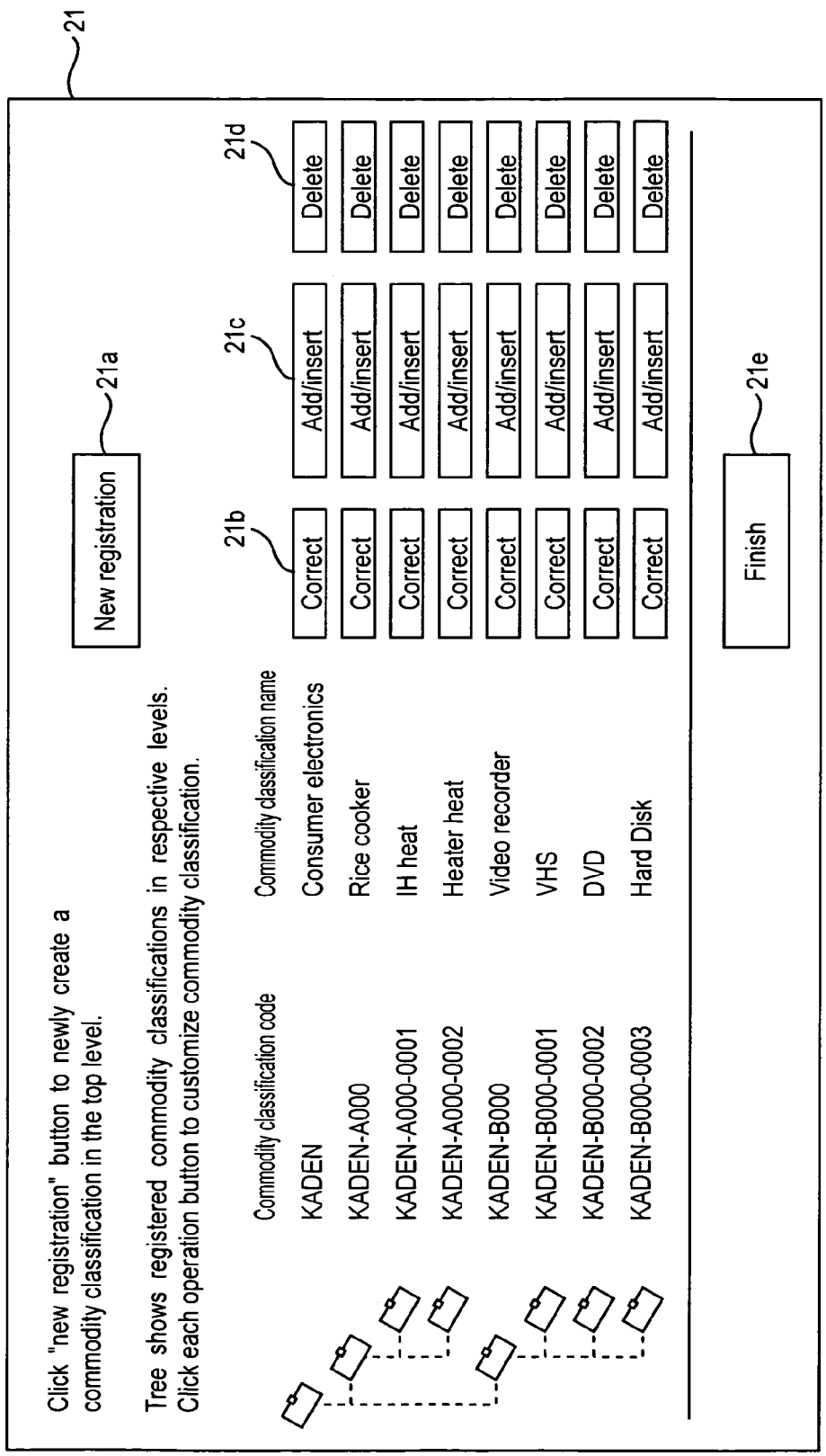
FIG. 5 shows one example of a main screen for the commodity classification management process.

After the CPU 10a creates the worktable, the CPU 10a generates screen data for displaying a main screen that shows a list based on the worktable and makes the monitor 10c display the main screen based on the screen data. FIG. 5 shows one example of the main screen 21.

In the main screen 21 of FIG. 5, the list of the commodity classification codes and the list of the commodity classification names, which are read from the "commodity classification code chain" field and the "commodity classification name" field of the records, respectively, are indicated. Further, the main screen 21 of FIG. 5 indicates a plurality of buttons 21a through 21e.

The button 21a is a new registration button that will be clicked by an operator who intends to add a commodity classification in the top level. The buttons 21b are correction buttons that will be clicked by an operator who intends to correct the information about the commodity classifications. The buttons 21c are addition/insertion buttons that will be clicked by an operator who intends to add or insert a commodity classification to a level other than the top level. The buttons 21d are deletion buttons that will be clicked by an operator who intends to delete the commodity classification. The button 21e is a finish button that will be clicked by an operator who intends to finish the process for the commodity classification management.

Moreover, in the main screen of FIG. 5, the numbers of the correction buttons 21b, the addition/insertion buttons 21c and the deletion buttons 21d are equal to the number of the rows that define the commodity classification codes and the commodity classification names. The buttons 21b through 21d are arranged near the lists so that one set of the buttons 21b through 21d is included in each row.

The CPU 10a brings the process to step S102 after the main screen 21 of FIG. 5 was displayed on the monitor 10c by executing the process at step S101 in FIG. 4.

At step S102, the CPU 10a waits until anyone of the buttons 21a through 21e indicated in the main screen 21 is clicked (S102; NO). When any one of the buttons is clicked (S102; YES), the CPU 10a brings the process to step S103.

At step S103, the CPU 10a discriminates which button in the main screen 21 was clicked. If the new registration button 21a in the main screen 21 was clicked (S103; new registration button), the CPU 10a brings the process to step S104.

Figure 6:
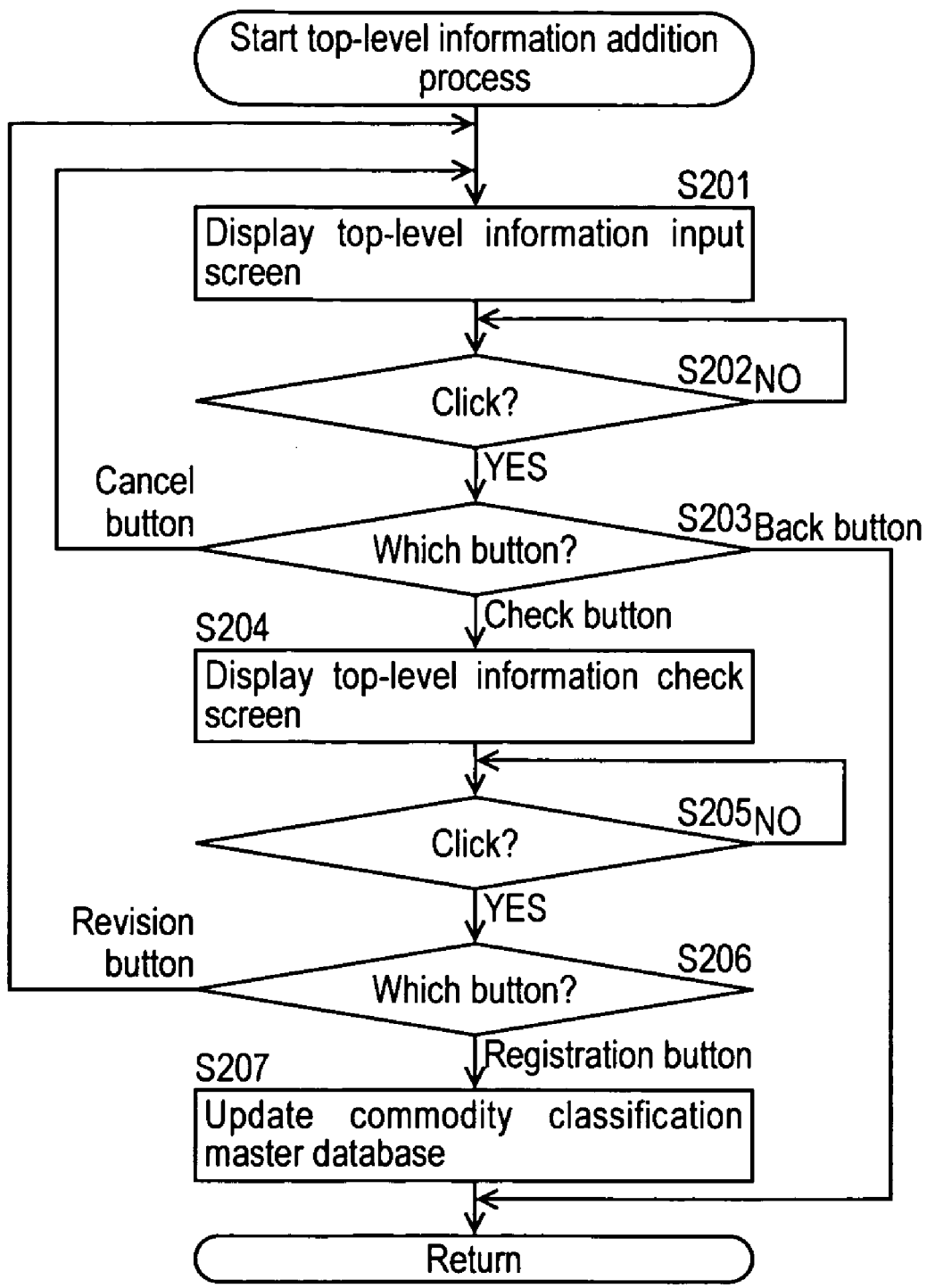
FIG. 6 is a flowchart for explaining the contents of a top-level information addition process.

At step S104, the CPU 10a executes a top-level information addition process. FIG. 6 is a flowchart for explaining the contents of the top-level information addition process.

At a first step S201 after the top-level information addition process starts, the CPU 10a executes a process to display a top-level information input screen on the monitor 10c.

Figure 7:
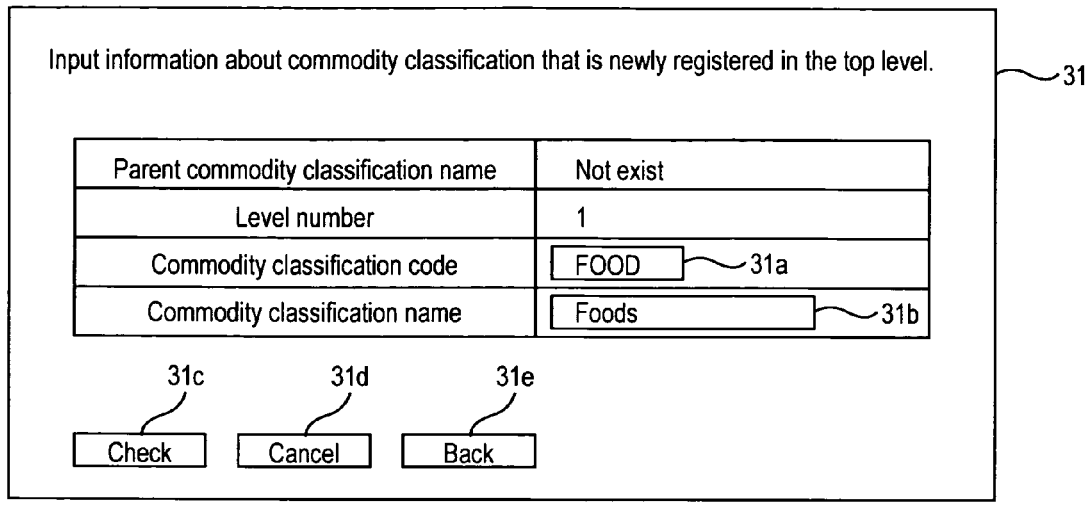
FIG. 7 shows one example of a top-level information input screen.

Specifically, at the step S201, the CPU 10a reads predetermined screen data included in the software package in the HDD 10g. Then, the CPU 10a incorporates the information for displaying the level number "1" showing the top level and the parent code "not exist" showing no parent commodity classification in immediately higher level into the screen data. After that, the CPU 10a displays the top-level information input screen on the monitor 10c based on the screen data. FIG. 7 shows one example of the top-level information input screen 31.

In the top-level information input screen 31 in FIG. 7, the level number "1" of the top level and the parent code "not exist" showing no parent commodity classification are displayed. Further, the top-level information input screen 31 in FIG. 7 shows two text boxes 31a, 31b and three buttons 31c, 31d and 31e.

One text box 31a is an input column in which the commodity classification code of the commodity classification added in the top level is entered. The other text box 31b is an input column in which the commodity classification name of the commodity classification added in the top level is entered.

Further, the button 31c is a check button clicked by an operator who finishes the data entry into the text boxes 31a and 31b. The button 31d is a cancel button clicked by an operator who intends to clear the character strings entered into the text boxes 31a and 31b. The button 31e is a back button clicked by an operator who intends to go back to the main screen 21.

The CPU 10a brings the process to step S202 after the top-level information input screen 31 of FIG. 7 was displayed on the monitor 10c by executing the process at step S201 in FIG. 6.

At step S202, the CPU 10a waits until one of the buttons 31c, 31d and 31e shown in the top-level information input screen 31 is clicked (S202; NO). When one of the buttons is clicked (S202; YES), the CPU 10a brings the process to step S203.

At step S203, the CPU 10a discriminates which button in the top-level information input screen 31 was clicked. If the cancel button 31d in the top-level information input screen 31 was clicked (S203; cancel button), the CPU 10a brings the process back to step S201. If the back button 31e in the top-level information input screen 31 was clicked (S203; back button), the CPU 10a finishes the top-level information addition process and brings the process back to step S101 in FIG. 4. Further, if the check button 31c in the top-level information input screen 31 was clicked (S203; check button), the CPU 10a brings the process to step S204.

At step S204, the CPU 10a executes the process to display a top-level information check screen on the monitor 10c.

Specifically, at step S204, the CPU 10a reads a predetermined screen data included in the software package in the HDD 10g. Then, the CPU 10a acquires the commodity classification code and the commodity classification name that have been entered into the text boxes 31a and 31b on the top-level information input screen 31 at the timing when the check button 31c was clicked at step S202. Further, the CPU 10a acquires the level number "1" of the top level and the parent code "not exist" showing no parent commodity classification incorporated into the screen data of the top-level information input screen 31. After that, the CPU 10a incorporates the commodity classification code, the commodity classification name, the level number and the information showing no parent commodity classification into the screen data.

Figure 8:
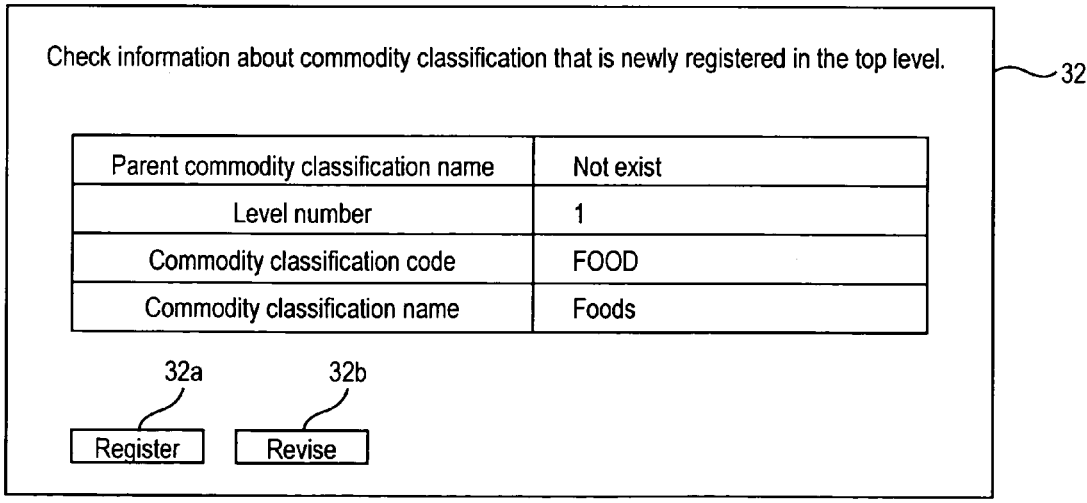
FIG. 8 shows one example of a top-level information check screen.

Then, the CPU 10a displays a top-level information check screen on the monitor 10c. FIG. 8 shows one example of the top-level information check screen 32. The top-level information check screen 32 in FIG. 8 is based on the same contents as shown in the top-level information input screen 31 in FIG. 7.

In the top-level information check screen 32, the commodity classification code and the commodity classification name, which are entered in the text boxes 31a and 31b in the top-level information input screen 31 at the timing when the check button 31c was clicked, are indicated. Further, the top-level information check screen 32 of FIG. 8 shows the level number "1" of the top level and the parent code "not exist" showing no parent commodity classification.

Still further, the top-level information check screen 32 shows two buttons 32a and 32b. One button 32a is a registration button that is clicked by an operator who can accept the commodity classification code and the commodity classification name displayed on the top-level information check screen 32. The other button 32b is a revision button that is clicked by an operator who cannot accept the commodity classification code and the commodity classification name displayed on the top-level information check screen 32.

The CPU 10a brings the process to step S205 after the top-level information check screen 32 for the top-level information addition process of FIG. 8 was displayed on the monitor 10c by executing the process at step S204 in FIG. 6.

At step S205, the CPU 10a waits until one of the buttons 32a and 32b shown in the top-level information check screen 32 is clicked (S205; NO). When one of the buttons is clicked (S205; YES), the CPU 10a brings the process to step S206.

At step S206, the CPU 10a discriminates which button in the top-level information check screen 32 was clicked. If the revision button 32b in the top-level information check screen 32 was clicked (S206; revision button), the CPU 10a brings the process back to step S201. If the registration button 31a in the top-level information check screen 32 was clicked (S206; registration button), the CPU 10a brings the process to step S207.

At step S207, the CPU 10a executes the process to updates the commodity classification master database 11 with the addition contents-accepted through the top-level information input screen 31 and the top-level information check screen 32.

Specifically, at step S207, the CPU 10a adds a new record to the commodity classification master database 11 as the last record. The "commodity classification code" field and the "commodity classification name" field in the new record contain the commodity classification code and the commodity classification name accepted through the respective screens 31 and 32, respectively. The "level number" field of the new record contains "1" and the "parent code" field thereof is blank. FIG. 9 shows the data structure of the commodity classification master database 11 after the new record concerning the commodity classification in the top level is added to the original construction shown,in FIG. 2. As shown in FIG. 9, the added record to the original structure shown in FIG. 2 has the same contents as shown in the top-level information input screen 31 in FIG. 7 and the top-level information check screen 32 in FIG. 8.

After the CPU 10a has added the new record concerning the commodity classification in the top level to the commodity classification master database 11 by executing the process at step S207, the CPU 10a finishes the top-level information addition process and brings the process back to step S101 in FIG. 4.

Figure 10:
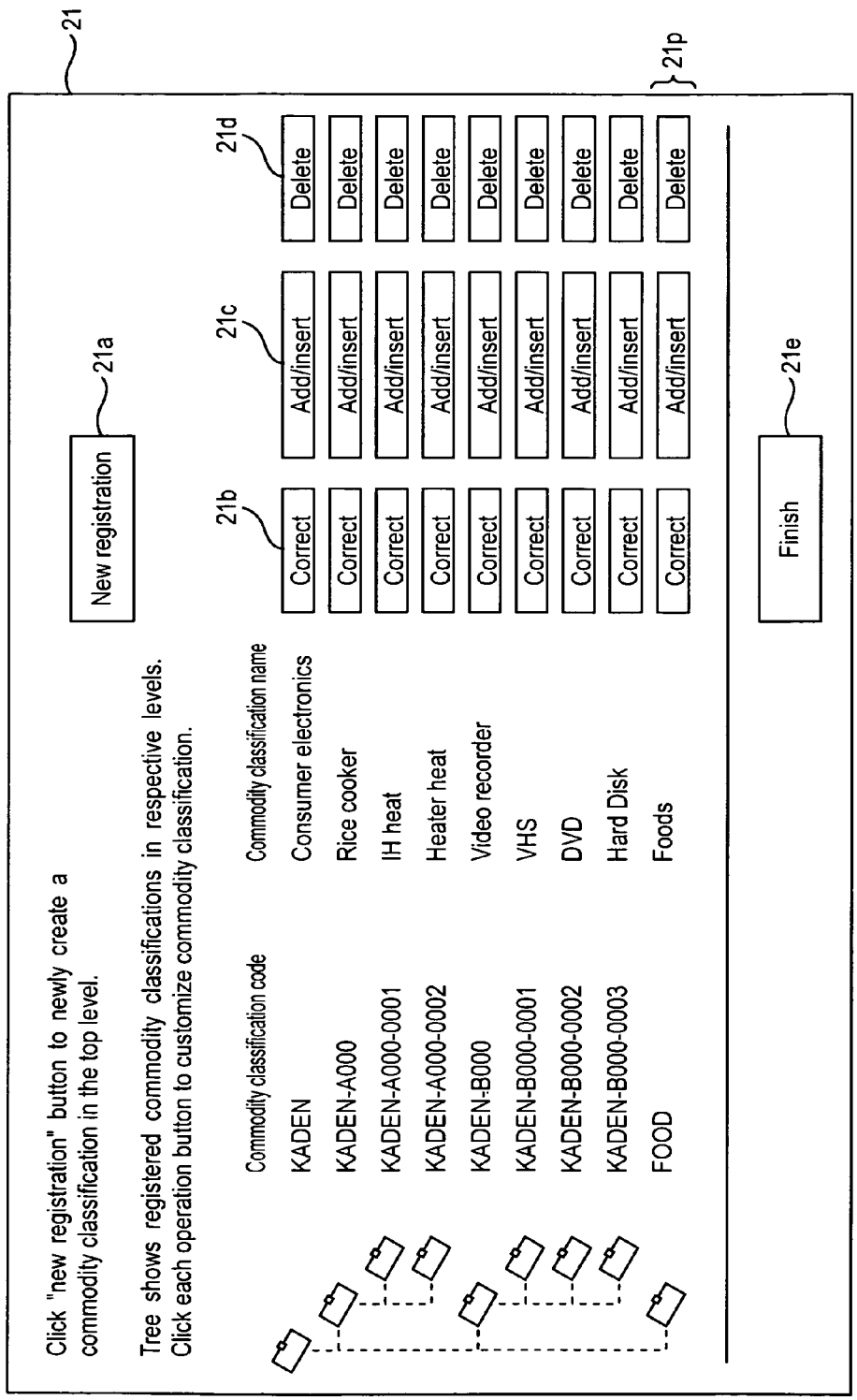
FIG. 10 shows one example of the main screen after a commodity classification is added in the top level.

FIG. 10 shows one example of the main screen 21 displayed on the monitor 10c when the process at step S101 has executed based on the commodity classification master database 11 shown in FIG. 9.

The comparison of FIG. 10 with FIG. 5 clarifies that a row 21p is added in the main screen 21 in FIG. 10 in response to the record registered to the commodity classification master database 11 during the top-level information addition process. The row 21p includes the commodity classification code and the commodity classification name concerning the added commodity classification, a correction button 21b, an addition/insertion button 21c and a deletion button 21d.

At step S103 in FIG. 4, if the correction button 21b in the main screen 21 in FIG. 5 was clicked (S103; correction button), the CPU 10a brings the process to step S105.

Figure 11:
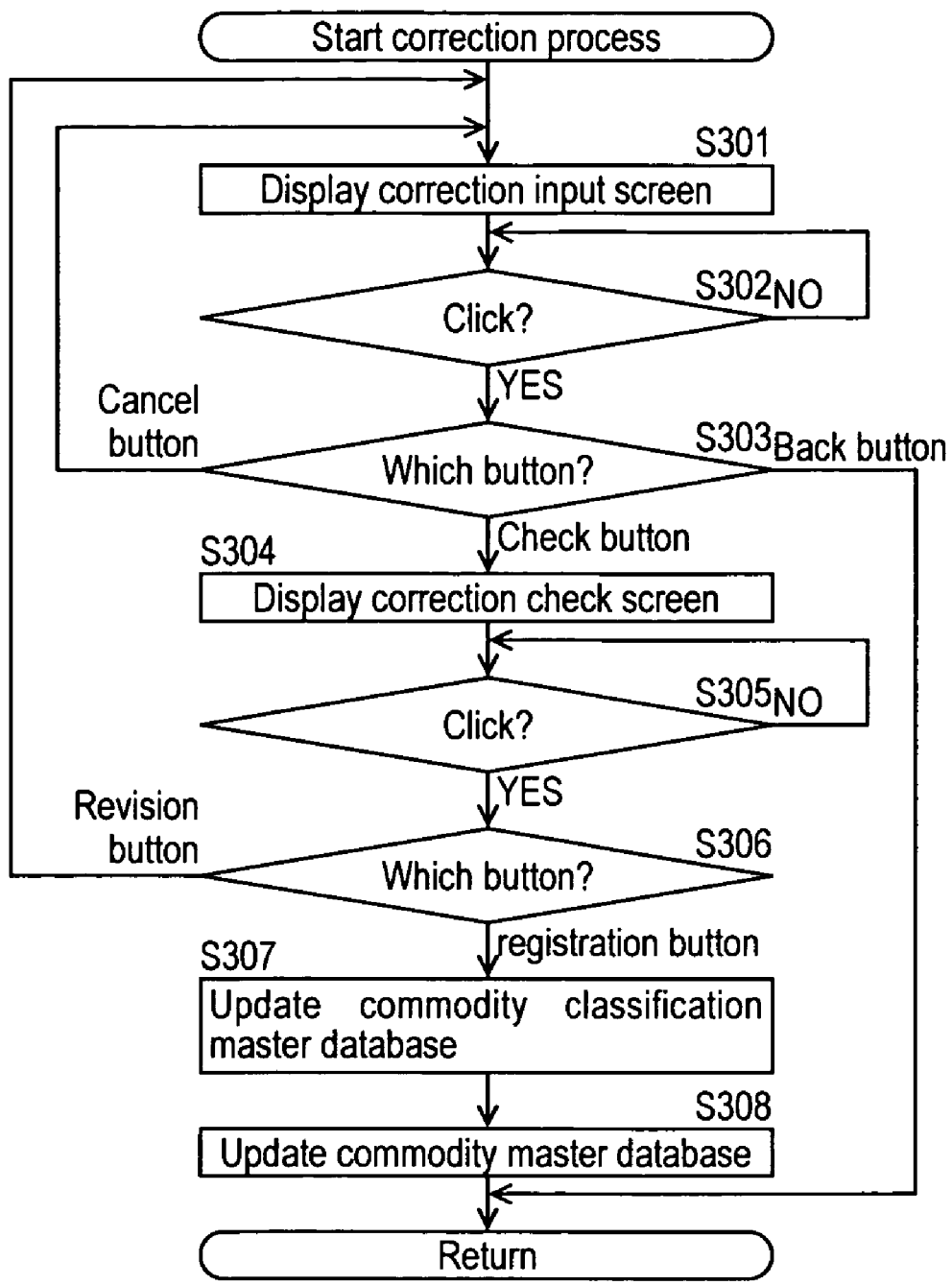
FIG. 11 is a flowchart for explaining the contents of a correction process.

At step S105, the CPU 10a executes a correction process. FIG. 11 is a flowchart for explaining the contents of the correction process.

At a first step S301 after the correction process starts, the CPU 10a executes the process to display a correction input screen on the monitor 10c.

Specifically, at step S301, the CPU 10a read a predetermined screen data from the software package in the HDD 10g. Then, the CPU 10a specifies the correction target record in response to the correction button 21b clicked at step S103 from the records in the worktable and acquires the level number, the commodity classification code chain, the commodity classification name and the parent code from the respective fields of the specified correction target record.

After that, the CPU 10a retracts the commodity classification name of the commodity classification whose commodity classification code is coincident with the acquired parent code from the commodity classification master database 11 as a parent commodity classification name. Further, the CPU 10a incorporates the parent commodity classification name, the acquired level number and the acquired commodity classification code chain, which consists of the codes except the commodity classification code in the bottom level into the screen data.

Then, the CPU 10a displays the correction input screen on the monitor 10c based on the screen data. FIG. 12 shows one example of the correction input screen 41. The correction input screen 41 shown in FIG. 12 is an example that will be displayed when the correction button 21b on the row of the "rice cooker" in the main screen 21 in FIG. 5 is clicked.

The correction input screen 41 shown in FIG. 12 indicates the parent commodity classification name, the level number and the commodity classification code chain, which consists of the codes except the commodity classification code in the same level of the commodity classification to be corrected. Further, two text boxes 41*a*, 41*b* and three buttons 41*c*, 41*d*, 41*e* are indicated in the correction input screen 41.

One text box 41*a* is an input column in which the commodity classification code of the commodity classification to be corrected is entered. The text box 41*a* is arranged at the rear of the commodity classification code chain, which consists of the codes except the commodity classification code in the level of the commodity classification to be corrected. The other text box 41*b* is an input column in which the commodity classification name is entered.

The three buttons 41*c*, 41*d* and 41*e* have the same functions as the buttons 31*c*, 31*d* and 31*e* in the top-level information input screen 31 shown in FIG. 7, respectively. That is, the button 41*c* is a check button, the button 41*d* is a cancel button, and the button 41*e* is a back button.

In addition, when the correction input screen 41 is displayed on the monitor 10*c*, the commodity classification code and the commodity classification name in the bottom level in the commodity classification code chain have been entered into the two text boxes 41*a* and 41*b*. Therefore, when an operator corrects the correction target record, he or she can check the condition before the correction in view of the commodity classification code and the commodity classification name shown in the text boxes 41*a* and 41*b*.

The CPU 10*a* brings the process to step S302 after the correction input screen 41 of FIG. 12 was displayed on the monitor 10*c* by executing the process at step S301 in FIG. 11.

At step S302, the CPU 10*a* waits until one of the buttons 41*c*, 41*d* and 41*e* in the input screen 41 for the correction process is clicked (S302; NO). When one of the buttons is clicked (S302; YES), the CPU 10*a* brings the process to step S303.

At step S303, the CPU 10*a* discriminates which button in the correction input screen 41 was clicked. If the cancel button 41*d* in the correction input screen 41 was clicked (S303; cancel button), the CPU 10*a* brings the process back to step S301. If the back button 41*e* in the correction input screen 41 was clicked (S303; back button), the CPU 10*a* finishes the correction process and brings the process back to step S101 in FIG. 4. Further, if the check button 41*c* in the correction input screen 41 was clicked (S303; check button), the CPU 10*a* brings the process to step S304.

At step S304, the CPU 10*a* executes the process to display a correction check screen on the monitor 10*c*.

Specifically, at step S304, the CPU 10*a* reads a predetermined screen data included in the software package in the HDD 10*g*. Then, the CPU 10*a* acquires the commodity classification code and the commodity classification name that have been entered into the text boxes 41*a* and 41*b* on the correction input screen 41 at the timing when the check button 41*c* was clicked at step S302. Further, the CPU 10*a* acquires the parent commodity classification name and the level number incorporated into the screen data of the correction input screen 41.

After that, the CPU 10*a* incorporates the acquired data, which includes the parent commodity classification name, the level number, the commodity classification code and the commodity classification name, into the screen data. Further, the CPU 10*a* incorporates the commodity classification code chain that is identical to the data incorporated into the screen data of the correction input screen 41 (except the commodity classification code in the level of the commodity classification to be corrected) into the screen data.

Then, the CPU 10*a* displays a correction check screen on the monitor 10*c* based on the screen data. FIG. 13 shows one example of the correction check screen 42. The correction check screen 42 in FIG. 13 is based on the same contents as shown in the correction input screen 41 in FIG. 12.

In the correction check screen 42 of FIG. 13, the parent commodity classification name and the level number are displayed. Further, the correction check screen 42 in FIG. 13 shows the commodity classification code and the commodity classification name that have been entered into the text boxes 41*a* and 41*b* on the correction input screen 41 at the timing when the check button 41*c* was clicked at step S302. In the correction check screen 42, the commodity classification code is displayed at the rear of the commodity classification code chain (except the commodity classification code in the level of the commodity classification to be corrected).

Still further, the correction check screen 42 in FIG. 13 indicates two buttons 42*a* and 42*b*. The two buttons 42*a* and 42*b* have the same functions as the buttons 32*a* and 32*b* in the top-level information check screen 32 for the addition process shown in FIG. 8, respectively. That is, the button 42*a* is a registration button and the button 42*b* is a revision button.

The CPU 10*a* brings the process to step S305 after the correction check screen 42 of FIG. 13 was displayed on the monitor 10*c* by executing the process at step S304 in FIG. 11.

At step S305, the CPU 10*a* waits until one of the buttons 42*a* and 42*b* shown in the correction check screen 42 is clicked (S305; NO). When one of the buttons is clicked (S305; YES), the CPU 10*a* brings the process to step S306.

At step S306, the CPU 10*a* discriminates which button in the correction check screen 42 was clicked. If the revision button 42*b* in the correction check screen 42 was clicked (S306; revision button), the CPU 10*a* brings the process back to step S301. If the registration button in the correction check screen 42 was clicked (S306; registration button), the CPU 10*a* brings the process to step S307.

At step S307, the CPU 10*a* executes the process to updates the commodity classification master database 11 with the correction contents accepted through the correction input screen 41 and the correction check screen 42 for the correction process.

Specifically, at step S307, the CPU 10*a* specifies the record in the commodity classification master database 11 corresponding to the correction target record in the worktable. Next, the CPU 10*a* replaces the commodity classification code and the commodity classification name in the specified record with the commodity classification code and the commodity classification name accepted as the correction contents through the respective screens 41 and 42. Further, the CPU 10*a* updates the "parent code" field of the commodity classification whose parent commodity classification was corrected, replacing it with the commodity classification code of the corrected commodity classification.

FIG. 14 shows the data structure of the commodity classification master database 11 after the commodity classification code has been corrected through the respective screens 41 and 42 shown in FIG. 12 and FIG. 13 based on the condition shown in FIG. 2. The comparison of FIG. 14 with FIG. 2 clarifies that the parent codes of the commodity classifications (IH heating and heater heating) that are dependent on the corrected commodity classification (rice cooker) in the immediately lower level thereof are also corrected in the commodity classification master database 11 after the correction.

The CPU 10*a* brings the process to step S308 after it has corrected the contents concerning the commodity classification in the commodity classification master database 11 by executing the process at step S307.

At step S308, the CPU 10*a* executes the process to updates the commodity master database 12 with the correction contents accepted through the correction input screen 41 and the correction check screen 42.

Specifically, at step S308, the CPU 10*a* extracts the commodity classification codes of the commodity classifications in the higher levels on which the corrected commodity classification is dependent from the commodity classification master database 11. Further, the CPU 10*a* extracts the commodity classification code of the commodity classification that is dependent on the corrected commodity classification from the commodity classification master database 11.

The CPU 10*a* searches the commodity master database 12 based on the extracted commodity classification code chain (except the commodity classification code in the same level as the commodity classification to be corrected) as a search key. Then, the CPU 10*a* updates the corresponding commodity classification code in the commodity code in the extracted record. FIG. 15 shows the data structure of the commodity master database 12 after the correction from FIG. 2 to FIG. 14 has been applied to the original structure shown in FIG. 3. The comparison of FIG. 15 with FIG. 3 clarifies that the above correction affects a part of the commodity code.

After the CPU 10*a* has corrected a part of the commodity code in the commodity master database 12 by executing the process at step S308, the CPU 10*a* finishes the correction process and brings the process back to step S101 in FIG. 4.

FIG. 16 shows one example of the main screen 21 displayed on the monitor 10*c* when the process at step S101 has executed based on the commodity classification master database 11 shown in FIG. 14. The comparison of FIG. 16 with FIG. 5 clarifies that a part of the commodity classification code chain in the list in the main screen 21 is replaced with a new commodity classification code in response to the correction.

At step S103 in FIG. 4, if the addition/insertion button 21*c* in the main screen 21 in FIG. 5 was clicked (S103; addition/insertion button), the CPU 10*a* brings the process to step S106.

Figure 17:
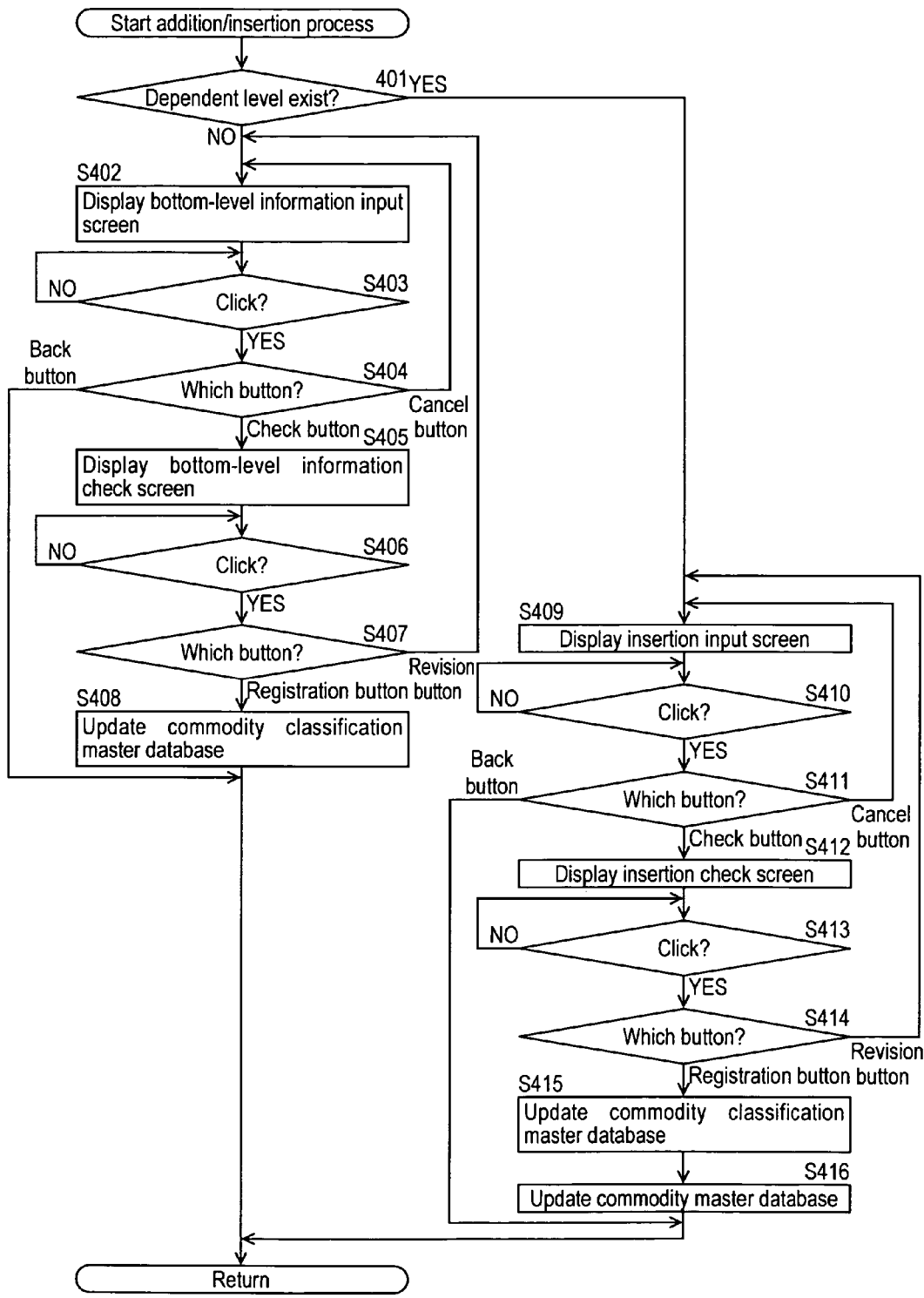
FIG. 17 is a flowchart for explaining the contents of an addition/insertion process.

At step S106, the CPU 10*a* executes an addition/insertion process. FIG. 17 is a flowchart for explaining the contents of the addition/insertion process.

At a first step S401 after the addition/insertion process starts, the CPU 10*a* searches the commodity classification master database 11 for the record whose "parent code" field contains the commodity classification code defined in the record of the worktable corresponding to the addition/insertion button 32*c* clicked at step S102. That is, the CPU 10*a* checks whether the dependent level exists or not. If there was no record that satisfies the search condition in the commodity classification master database 11 (S401; NO), the CPU 10*a* brings the process to step S402.

At step S402, the CPU 10*a* executes the process to display a bottom-level information input screen on the monitor 10*c*.

Specifically, at step S402, the CPU 10*a* reads predetermined screen data included in the software package in the HDD 10*g*.

Then, the CPU 10*a* acquires the level number, the commodity classification code chain, the commodity classification name and the parent code from the respective fields of the record in the worktable corresponding to the addition/insertion button 21*c* that was determined to be clicked at step S103.

Further, the CPU 10*a* increments the acquired level number by one. After that, the CPU 10*a* incorporates the incremented level number, the commodity classification name and the commodity classification code chain into the screen data.

Then, the CPU 10*a* displays the bottom-level information input screen on the monitor 10*c* based on the screen data. FIG. 18 shows one example of the bottom-level information input screen 51. The bottom-level information input screen 51 of FIG. 18 is an example that will be displayed when the addition/insertion button 21*c* on the row of "VHS" in the main screen 21 of FIG. 5 is clicked.

The bottom-level information input screen 51 shown in FIG. 18 indicates the parent commodity classification name, the level number and the commodity classification code chain. Further, two text boxes 51*a*, 51*b* and three buttons 51*c*, 51*d*, 51*e* are indicated in the bottom-level information input screen 51.

One text box 51*a* is an input column in which the commodity classification code of the commodity classification to be added in the bottom level is entered. The text box 41*a* is arranged at the rear of the commodity classification code chain. The other text box 51*b* is an input column in which the commodity classification name of the commodity classification to be added in the bottom level is entered.

The three buttons 51*c*, 51*d* and 51*e* have the same functions as the buttons 31*c*, 31*d* and 31*e* in the top-level information input screen 31 shown in FIG. 7, respectively. That is, the button 41*c* is a check button, the button 41*d* is a cancel button, and the button 41*e* is a back button.

The CPU 10*a* brings the process to step S403 after the bottom-level information input screen 51 of FIG. 18 was displayed on the monitor 10*c* by executing the process at step S402 in FIG. 17.

At step S403, the CPU 10*a* waits until any one of the buttons 51*c*, 51*d* and 51*e* indicated in the bottom-level information input screen 51 is clicked (S403; NO). When any one of the buttons is clicked (S403; YES), the CPU 10*a* brings the process to step S404.

At step S404, the CPU 10*a* discriminates which button in the bottom-level information input screen 51 was clicked. If the cancel button 51*d* in the bottom-level information input screen 51 was clicked (S404; cancel button), the CPU 10*a* brings the process back to step S402. If the back button 51*e* in the bottom-level information input screen 51 was clicked (S404; back button), the CPU 10*a* finishes the addition/insertion process and brings the process back to step S101 in FIG. 4. Further, if the check button 51*c* in the bottom-level information input screen 51 was clicked (S404; check button), the CPU 10*a* brings the process to step S405.

At step S405, the CPU 10*a* executes the process to display a bottom-level information check screen on the monitor 10*c*.

Specifically, at step S405, the CPU 10*a* reads a predetermined screen data included in the software package in the HDD 10*g*. Then, the CPU 10*a* acquires the commodity classification code and the commodity classification name that have been entered into the text boxes 51*a* and 51*b* on the bottom-level information input screen 51 at the timing when the check button 51*c* was clicked at step S403. Further, the CPU 10*a* acquires the parent commodity classification name, the level number and the commodity classification code chain incorporated into the screen data of the bottom-level information input screen 51.

After that, the CPU 10*a* incorporates the acquired data, which includes the parent commodity classification name, the level number, the commodity classification code and the commodity classification name, into the screen data.

Then, the CPU 10*a* displays the bottom-level information check screen on the monitor 10*c* based on the screen data. FIG. 19 shows one example of the bottom-level information check screen 52. The bottom-level information check screen 52 in FIG. 19 is based on the same contents as shown in the bottom-level information input screen 51 in FIG. 18.

In the bottom-level information check screen 52 of FIG. 19, the parent commodity classification name and the level number are displayed. Further, the bottom-level information check screen 52 of FIG. 19 shows the commodity classification code and the commodity classification name that have been entered into the text boxes 51*a* and 51*b* on the bottom-level information input screen 51 at the timing when the check button 51*c* was clicked at step S403. In the bottom-level information check screen 52, the commodity classification code is displayed at the rear of the commodity classification code chain that consists of the commodity classification codes in the higher levels on which the commodity classification to be added is dependent.

Still further, the bottom-level information check screen 52 of FIG. 19 indicates two buttons 52*a* and 52*b*. The two buttons 52*a* and 52*b* have the same functions as the buttons 32*a* and 32*b* in the top-level information check screen 32 for the top-level information addition process shown in FIG. 8, respectively. That is, the button 52*a* is a registration button and the button 52*b* is a revision button.

The CPU 10*a* brings the process to step S406 after the bottom-level information check screen 52 of FIG. 19 was displayed on the monitor 10*c* by executing the process at step S405 in FIG. 17.

At step S406, the CPU 10*a* waits until anyone of the buttons 52*a* and 52*b* indicated in the bottom-level information check screen 52 is clicked (S406; NO). When any one of the buttons is clicked (S406; YES), the CPU 10*a* brings the process to step S407.

At step S407, the CPU 10*a* discriminates which button in the bottom-level information check screen 52 was clicked. If the revision button 52*b* in the bottom-level information check screen 52 was clicked (S407; revision button), the CPU 10*a* brings the process back to step S402. If the registration button 52*a* in the bottom-level information check screen 52 was clicked (S407; registration button), the CPU 10*a* brings the process to step S408.

At step S408, the CPU 10*a* executes the process to updates the commodity classification master database 11 with the correction contents accepted through the bottom-level information input screen 51 and the bottom-level information check screen 52.

Specifically, at step S408, the CPU 10*a* acquires the parent code read from the worktable at step S403 and the level number that is incorporated in the screen data of the bottom-level information check screen 52. Next, the CPU 10*a* adds a new record to the commodity classification master database 11 as the last record. The "commodity classification code" field and the "commodity classification name" field in the new record contain the commodity classification code and the commodity classification name accepted through the respective screens 51 and 52, respectively. The "level number" field and the "parent code" field of the new record contain the above-described level number and parent code, respectively.

FIG. 20 shows the data structure of the commodity classification master database 11 after the new record concerning the commodity classification in the bottom level is added to the original construction shown in FIG. 2. As shown in FIG. 20, the added record to the original structure shown in FIG. 2 has the same contents as shown in the respective screens 51 and 52 of FIGS. 18 and 19.

After the CPU 10*a* has added the new record concerning the commodity classification in the bottom level to the commodity classification master database 11 by executing the process at step S408, the CPU 10*a* finishes the addition/insertion process and brings the process back to step S101 in FIG. 4.

FIG. 21 shows one example of the main screen 21 displayed on the monitor 10*c* when the process at step S101 has executed based on the commodity classification master database 11 shown in FIG. 20.

The comparison of FIG. 21 with FIG. 5 clarifies that a row 21*r* is added in the main screen 21 in FIG. 21 in response to the record registered to the commodity classification master database 11 during the insertion/addition process. The row 21*r* includes the commodity classification code chain and the commodity classification name concerning the added commodity classification, a correction button 21*b*, an addition/insertion button 21*c* and a deletion button 21*d*.

Further, if it is determined that there is a record whose "parent code" field contains the commodity classification code of the target in the commodity classification master database 11 at step S401 in FIG. 17 (S401; YES), the CPU 10*a* brings the process to step S409.

At step S409, the CPU 10*a* executes the process to display an insertion input screen on the monitor 10*c*.

Specifically, at step S409, the CPU 10*a* reads predetermined screen data included in the software package in the HDD 10*g*.

Then, the CPU 10*a* acquires the level number, the commodity classification code chain, the commodity classification name and the parent code from the respective fields of the record in the worktable corresponding to the addition/insertion button 21*c* that was determined to be clicked at step S103.

Further, the CPU 10*a* increments the acquired level number by one and extracts the record whose parent code is coincident with the acquired commodity classification code from the commodity classification master database 11.

After that, the CPU 10*a* incorporates the incremented level number, the commodity classification name and the commodity classification code chain into the screen data. Further, the CPU 10*a* incorporates the commodity classification codes and the commodity classification names of the commodity classifications, which are dependent on the same parent commodity classification in the same level as the commodity classification to be inserted, into the screen data.

Then, the CPU 10*a* displays an insertion input screen on the monitor 10*c* based on the screen data. FIG. 22 shows one example of the insertion input screen 61. The insertion input screen 61 shown in FIG. 22 is an example that will be displayed when the addition/insertion button 21*c* on the row of the "video recorder" in the main screen 21 in FIG. 5 is clicked.

The insertion input screen 61 shown in FIG. 22 indicates the above-described commodity classification name as the parent commodity classification name, the level number and the commodity classification code chain. Further, two text boxes 61*a*, 61*b*, a plurality of check boxes 61*c* and three buttons 61*d*, 61*e*, 61*f* are indicated in the insertion input screen 61.

One text box 61a is an input column in which the commodity classification code of the commodity classification to be added in the level represented by the level number is entered. The text box 61a is arranged at the rear of the commodity classification code chain. The other text box 61b is an input column in which the commodity classification name of the commodity classification to be added in the level is entered.

The check boxes 61c are used to select the commodity classifications that should be dependent on the commodity classification to be inserted among the commodity classifications that are dependent on the same parent commodity classification in the same level as the commodity classification to be inserted. The number of the check boxes 61c is equal to the number of the commodity classifications in the same level. Each of the check boxes 61c is arranged at the top of each row on which the commodity classification code and the commodity classification name of the commodity classification are listed.

The three buttons 61d, 61e and 61f have the same functions as the buttons 31c, 31d and 31e in the top-level information input screen 31 shown in FIG. 7, respectively. That is, the button 61d is a check button, the button 61e is a cancel button, and the button 61f is a back button.

The CPU 10a brings the process to step S410 after the insertion input screen 61 of FIG. 22 was displayed on the monitor 10c by executing the process at step S409 in FIG. 17.

At step S410, the CPU 10a waits until any one of the buttons 61c, 61d and 61e indicated in the insertion input screen 61 is clicked (S410; NO). When anyone of the buttons is clicked (S410; YES), the CPU 10a brings the process to step S411.

At step S411, the CPU 10a discriminates which button in the insertion input screen 61 was clicked. If the cancel button 61d in the insertion input screen 61 was clicked (S411; cancel button), the CPU 10a brings the process back to step S409. If the back button 61e in the insertion input screen 61 was clicked (S411; back button), the CPU 10a finishes the addition/insertion process and brings the process back to step S101 in FIG. 4. Further, if the check button 61c in the insertion input screen 61 was clicked (S411; check button), the CPU 10a brings the process to step S412.

At step S412, the CPU 10a executes the process to display a insertion check screen on the monitor 10c.

Specifically, at step S412, the CPU 10a reads a predetermined screen data included in the software package in the HDD 10g. Then, the CPU 10a acquires the commodity classification code and the commodity classification name that have been entered into the text boxes 61a and 61b on the insertion input screen 61 at the timing when the check button 61d was clicked at step S410. Further, the CPU 10a acquires the parent commodity classification name, the level number and the commodity classification code chain incorporated into the screen data of the insertion input screen 61. Still further, the CPU 10a acquires the commodity classification code and the commodity classification name of the commodity classification in the same level corresponding to the check box 61c in which a check mark was made at the timing when the check button 61d was clicked at step S410 as information about the moving-back target.

After that, the CPU 10a incorporates the acquired data, which includes the parent commodity classification name, the level number, the commodity classification code, the commodity classification name and the commodity classification code chain, into the screen data. The CPU 10a also incorporates the commodity classification code and the commodity classification name about the moving-back target into the screen data.

Then, the CPU 10a displays an insertion check screen on the monitor 10c based on the screen data. FIG. 23 shows one example of the insertion check screen 62. The insertion check screen 62 in FIG. 23 is based on the same contents as shown in the insertion input screen 61 of FIG. 22.

In the insertion check screen 62 of FIG. 23, the parent commodity classification name and the level number are displayed. Further, the insertion check screen 62 of FIG. 23 shows the commodity classification code and the commodity classification name that have been entered into the text boxes 61a and 61b on the insertion input screen 61 at the timing when the check button 61c was clicked at step S410. In the insertion check screen 62, the commodity classification code is displayed at the rear of the commodity classification code chain that consists of the commodity classification codes in the higher levels on which the commodity classification to be inserted is dependent.

Further, the insertion check screen 62 of FIG. 23 shows the old commodity classification code chains of the moving-back target commodity classifications before the moving back and the new commodity classification code chains of that after the moving back.

Still further, the insertion check screen 62 of FIG. 23 indicates two buttons 62a and 62b. The two buttons 62a and 62b have the same functions as the buttons 32a and 32b in the top-level information check screen 32 shown in FIG. 8, respectively. That is, the button 62a is a registration button and the button 62b is a revision button.

The CPU 10a brings the process to step S413 after the insertion check screen 62 of FIG. 23 was displayed on the monitor 10c by executing the process at step S412 in FIG. 17.

At step S413, the CPU 10a waits until any one of the buttons 62a and 62b indicated in the insertion check screen 62 is clicked (S413; NO). When any one of the buttons is clicked (S413; YES), the CPU 10a brings the process to step S414.

At step S414, the CPU 10a discriminates which button in the insertion check screen 62 was clicked. If the revision button 62b in the insertion check screen 62 was clicked (S411; revision button), the CPU 10a brings the process back to step S409. If the registration button 62a in the insertion check screen 62 was clicked (S411; registration button), the CPU 10a brings the process to step S415.

At step S415, the CPU 10a executes the process to updates the commodity classification master database 11 with the insertion contents accepted through the insertion input screen 61 and the insertion check screen 62.

Specifically, at step S415, the CPU 10a acquires the parent code read from the worktable at step S409 and the level number that is incorporated in the screen data of the insertion check screen 62. Next, the CPU 10a adds a new record to the commodity classification master database 11 as the last record. The "commodity classification code" field and the "commodity classification name" field in the new record contain the commodity classification code and the commodity classification name accepted through the respective screens 61 and 62, respectively. The "level number" field and the "parent code" field of the new record contain the above-described level number and parent code, respectively. Further, the CPU 10a replaces a content of the "parent code" field of the moving-back target record with the above-described commodity classification code, and increments the level number in the "level number" field of the record by one.

FIG. 24 shows the data structure of the commodity classification master database 11 after the new record concerning the commodity classification in the middle level is inserted into the original construction shown in FIG. 2. As shown in FIG. 24, the inserted record into the original structure shown in FIG. 2 has the same contents as shown in the respective screens 61 and 62 of FIGS. 22 and 23.

After the CPU 10a has inserted the new record concerning the commodity classification in the middle level to the commodity classification master database 11 by executing the process at step S415, the CPU 10a brings the process to step S416.

At step S416, the CPU 10a executes the process to updates the commodity master database 12 with the correction contents accepted through the insertion input screen 61 and the insertion check screen 62.

Specifically, at step S416, the CPU 10a extracts the commodity classification codes of the commodity classifications in the higher levels on which the commodity classification inserted in the middle level is dependent from the commodity classification master database 11. Further, the CPU 10a extracts the commodity classification codes of the commodity classifications that are dependent on the inserted commodity classification from the commodity classification master database 11.

The CPU 10a searches the commodity master database 12 based on the extracted commodity classification code chain as a search key. Then, the CPU 10a inserts the inserted commodity classification code into the corresponding level of the commodity code in the extracted record. FIG. 25 shows the data structure of the commodity master database 12 after the insertion from FIG. 2 to FIG. 24 has been applied to the original structure shown in FIG. 3. The comparison of FIG. 25 with FIG. 3 clarifies that the above insertion affects a part of the commodity code.

After the CPU 10a has inserted the commodity classification code into the commodity code in the commodity master database 12 by executing the process at step S416, the CPU 10a finishes the addition/insertion process and brings the process back to step S101 in FIG. 4.

Figure 26:
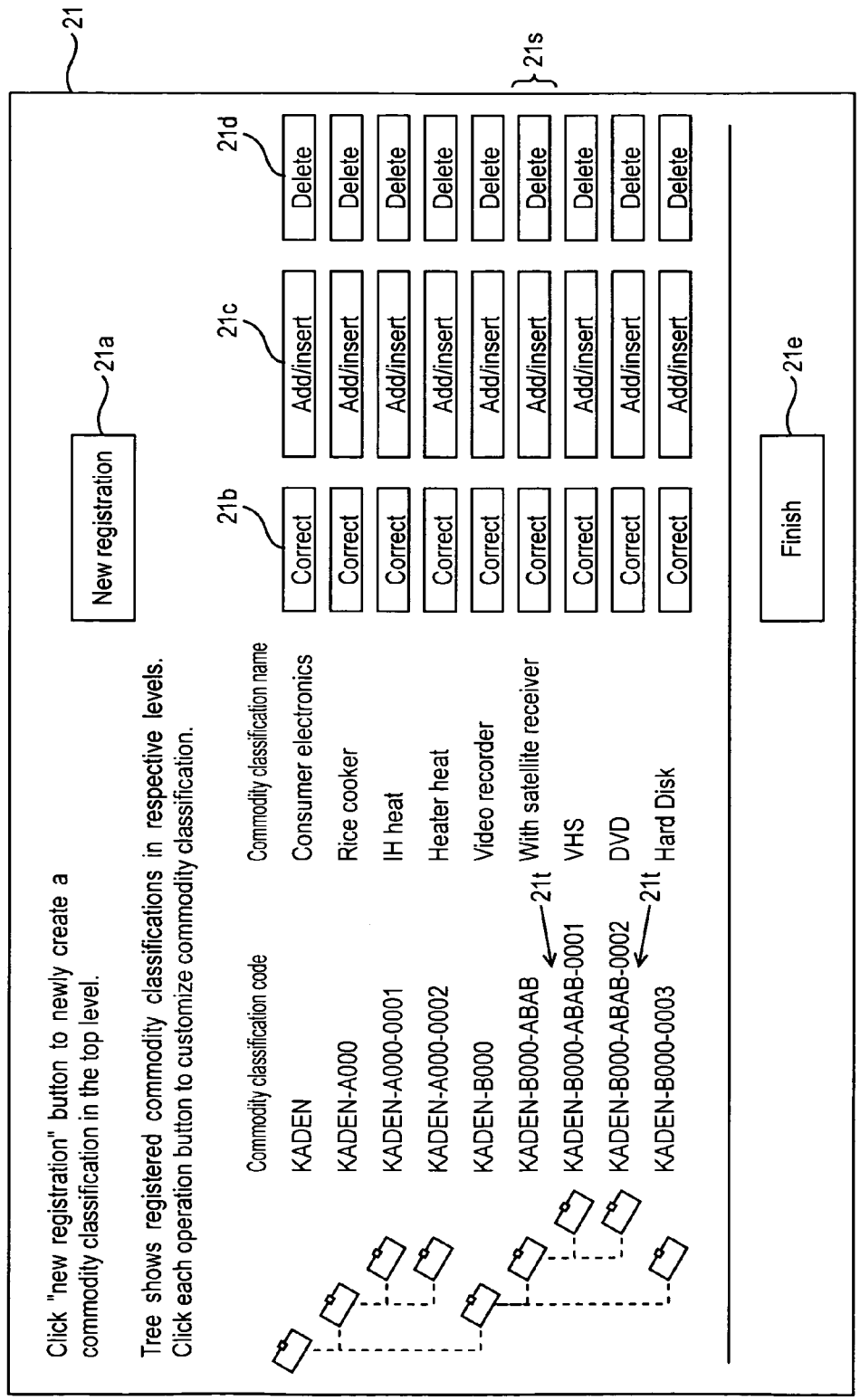
FIG. 26 shows one example of the main screen after a commodity classification is added in the middle level.

FIG. 26 shows one example of the main screen 21 displayed on the monitor 10c when the process at step S101 has executed based on the commodity classification master database 11 shown in FIG. 24. The comparison of FIG. 26 with FIG. 5 clarifies that a new commodity classification code 21t is inserted into the list in the main screen 21 of FIG. 26 in response to the insertion.

At step S103 in FIG. 4, if the deletion button 21d in the main screen 21 in FIG. 5 was clicked (S103; deletion button), the CPU 10a brings the process to step S107.

Figure 27:
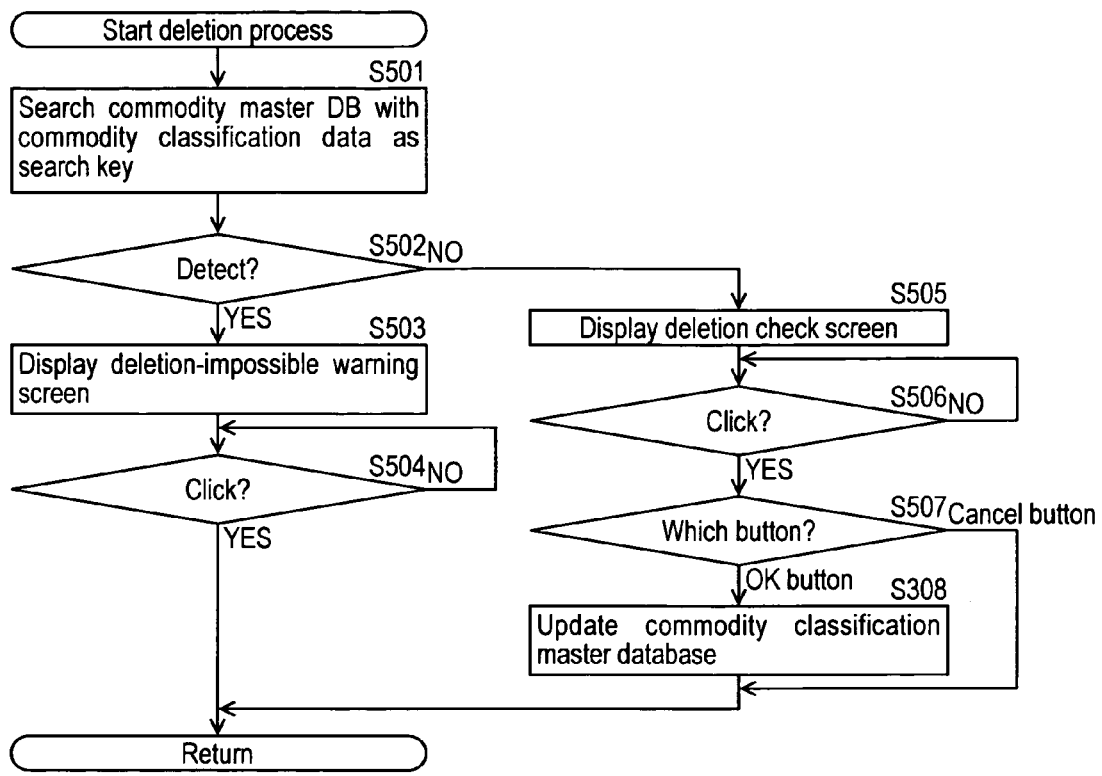
FIG. 27 is a flowchart for explaining the contents of a deletion process.

At step S107, the CPU 10a executes the deletion process. FIG. 27 is a flowchart for explaining the contents of the deletion process.

At a first step S501 after the deletion process starts, the CPU 10a reads the commodity classification code as the deletion target from the record in the worktable corresponding to the deletion button 21d that was clicked at step S102. Then, the CPU 10a searches the commodity master database 12 with the commodity classification code of the deletion target as a search key.

At the next step S502, the CPU 10a searches the commodity master database 12 for the record containing the commodity code that includes the commodity classification code to be deleted. That is, it is discriminated whether the commodity classification code to be deleted is still used in the commodity master database 12 as a part of the commodity code.

When the record containing the commodity code that includes the commodity classification code to be deleted was detected at step S502 (S502; YES), the CPU 10a brings the process to step S503.

At step S503, the CPU 10a executes the process to display a deletion-impossible warning screen on the monitor 10c.

Specifically, at the step S503, the CPU 10a reads predetermined screen data included in the software package in the HDD 10g. Then, the CPU 10a reads the commodity classification name from the record of the worktable corresponding to the deletion button 21d clicked at step 102 and incorporates the read commodity classification name into the screen data.

Figure 28:
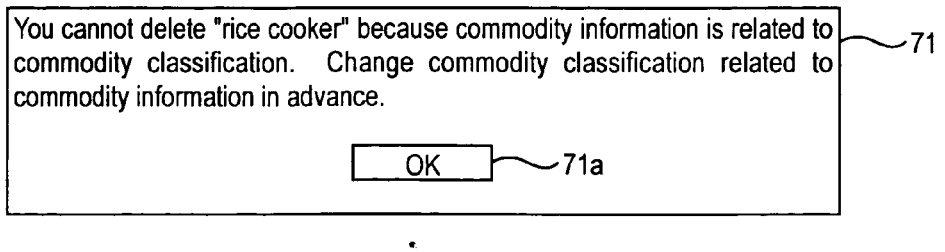
FIG. 28 shows one example of a deletion-impossible warning screen.

After that, the CPU 10a displays a deletion-impossible warning screen on the monitor 10c based on the screen data. FIG. 28 shows one example of the deletion-impossible warning screen 71. The deletion-impossible warning screen 71 shown in FIG. 28 will be displayed after the deletion button 21d on the row of "rice cooker" in the main screen 21 of FIG. 5 is clicked.

The deletion-impossible warning screen 71 displays that there is the commodity information to which the commodity code using the commodity classification code to be deleted is assigned and that the commodity classification cannot be deleted while the commodity code uses the commodity classification code to be deleted (namely, the commodity classification can be deleted only after the commodity classification is eliminated from the commodity master database 12).

Further, the deletion-impossible warning screen 71 of FIG. 28 indicates a button 71a. The button 71a is an OK button that will be clicked by an operator who understands that the commodity classification to be deleted cannot be deleted at present.

The CPU 10a brings the process to step S504 after the deletion-impossible warning screen 71 of FIG. 28 was displayed on the monitor 10c by executing the process at step S503 in FIG. 27.

At step S504, the CPU 10a waits until the OK button 71a indicated in the deletion-impossible warning screen 71 is clicked (S504; NO). When the OK button 71a is clicked (S504; YES), the CPU 10a finishes the deletion process and brings the process back to step S101 in FIG. 4.

On the other hand, at step S502, if no record containing the commodity code that includes the commodity classification code to be deleted was detected in the commodity master database 12 (S502; NO), the CPU 10a judges that the commodity classification code to be deleted is not used even as a part of the commodity code, and the CPU 10a brings the process to step S505.

At step S505, the CPU 10a executes the process to display a deletion check screen on the monitor 10c.

Specifically, at step S505, the CPU 10a reads a predetermined screen data included in the software package in the HDD 10g. Then, the CPU 10a reads the commodity classification name from the record in the worktable corresponding to the deletion button 32d that was clicked at step S102 and incorporate this commodity classification name into the screen data.

Figures 29, 30:
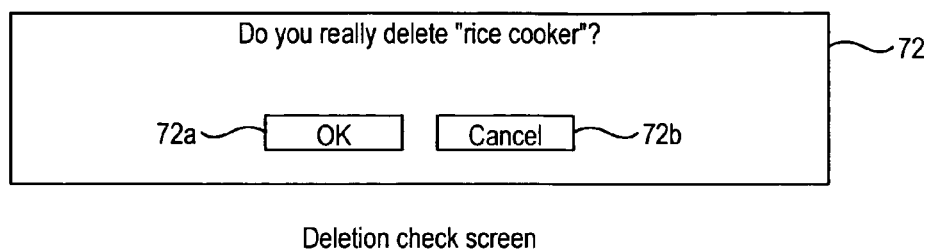
FIG. 29 shows one example of a deletion check screen.
FIG. 30 shows data structure of the commodity classification master database after one commodity classification is deleted.

Then, the CPU 10a displays the deletion check screen on the monitor 10c based on the screen data. FIG. 29 shows one example of the deletion check screen 72. The deletion check screen 72 in FIG. 29 will be displayed after the deletion button 21d on the row of "rice cooker" in the main screen 21 of FIG. 5 is clicked. However, it is assumed that the commodity classification code of the "rice cooker" is not used in the commodity master database 12.

The deletion check screen 72 of FIG. 29 shows the question whether the commodity classification represented by the commodity classification name may be deleted or not. Further, the deletion check screen 72 indicates two buttons 72a and 72b.

One button 72a is an OK button that is clicked by an operator who intends to delete the commodity classification represented by the commodity classification name displayed on the deletion check screen 72. The other button 72b is a cancel button that is clicked by an operator who intends to cancel the deletion of the commodity classification represented by the commodity classification name displayed on the deletion check screen 72.

The CPU 10a brings the process to step S506 after the deletion check screen 72 of FIG. 29 was displayed on the monitor 10c by executing the process at step S505 in FIG. 27.

At step S506, the CPU 10a waits until anyone of the buttons 71a and 71b indicated in the deletion check screen 72 is clicked (S506; NO). When any one of the buttons is clicked (S506; YES), the CPU 10a brings the process to step S507.

At step S507, the CPU 10a discriminates which button in the deletion check screen 72 was clicked. If the cancel button 72b in the deletion check screen 72 was clicked (S507; cancel button), the CPU 10a finishes the deletion process and brings the process back to step S101 in FIG. 4. If the OK button 72a in the deletion check screen 72 was clicked (S507; OK button), the CPU 10a brings the process to step S508.

At step S508, the CPU 10a executes the process to delete the record concerning the commodity classification to be deleted from the commodity classification master database 11.

Specifically, at step S508, the CPU 10a deletes the record concerning the commodity classification to be deleted from the commodity classification master database 11.

Next, the CPU 10a replaces a content of the "parent code" field of a record whose parent commodity classification was the deleted commodity classification with the parent code of the deleted commodity classification, and decrements the level number in the "level number" field of the record by one. Further, the CPU 10a repeats the similar updates for the records of the commodity classifications that were dependent on the deleted commodity classification in the lower levels to the bottom level.

FIG. 30 shows a data structure of the commodity classification master database 11 after the record of the commodity classification to be deleted is deleted from the original construction shown in FIG. 2. The record of the commodity classification to be deleted can be deleted only when the commodity classification code of the deletion target was deleted from the commodity master database 12 in advance and it has been already impossible to use. Here, it is assumed that the commodity classification deleted during the term from FIG. 2 to FIG. 30 is not used in the commodity master database 12 of FIG. 3.

The CPU 10a deletes the record from the commodity classification master database 11 by executing the process at step S508. After that, the CPU 10a finishes the deletion process and brings the process back to step S101 in FIG. 4.

Figure 31:
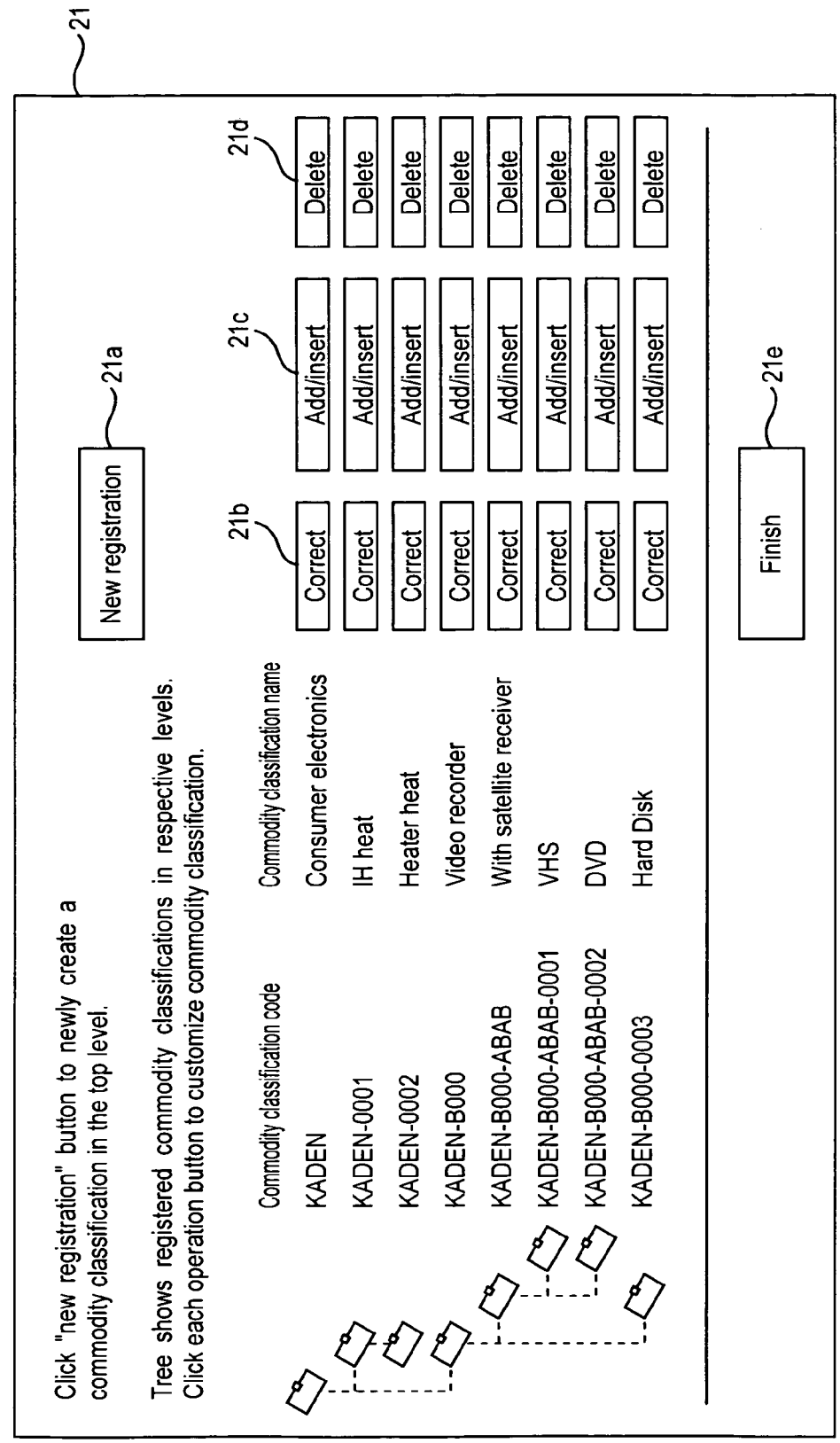
FIG. 31 shows one example of the main screen after one commodity classification.

In addition, FIG. 31 shows one example of the main screen 21 displayed on the monitor 10c when the process at step S101 is executed based on the commodity classification master database 11 shown in FIG. 10. The comparison of FIG. 31 with FIG. 5 clarifies that the row concerning one commodity classification (rice cooker) is deleted, and the levels of the commodity classifications (IH heating and heater heating) that belonged thereto are moved up by one step.

Further, when the finish button 21e in the main screen 21 in FIG. 5 is clicked at step S103 in FIG. 4 (S103; finish button), the CPU 10a finishes the commodity classification management process.

According to the above-described commodity information management apparatus 10 of the embodiment, when the commodity classification is added or deleted, the level number and the parent code of the commodity classification whose level varies in response to the addition or deletion are rewritten appropriately. As a result, the number of levels can be smaller than or larger than three, and a part of the code system of the commodity classification code can be customized with an easy operation.

Further, when the commodity classification is added or deleted, the commodity classification code will be added or deleted with respect to the commodity code in the commodity master database 12. Therefore, a matching between the commodity information and the commodity classification code can be easily kept even if a part of the code system of the commodity classification code is customized.

Still further, all the records in relation to the commodity classification are accumulated in the commodity classification master database 11 and the level number of the commodity classification and the parent code are assigned to each of the records (see FIG. 2). With this construction, a plurality of commodity classification master databases provided in the conventional commodity information management apparatus can be unified into the common commodity classification master database 11. Therefore, when a user customizes the code system, it is unnecessary to update a plurality of commodity classification master databases.

What is claimed is:

1. A commodity information management program for users to retrieve information of their various commodities, said program controlling a computer to be operated as equipment comprising:

first storage that stores a database for defining various attributes, which form a hierarchical structure, of respective commodities, said database including records each of which has fields of a commodity classification code containing the current attribute, a level number containing a level of the current attribute in said hierarchical structure and a parent code containing a commodity classification code showing the parent attribute in the immediately higher level defining a broader sense than the current attribute;

a first accepting portion that accepts information designating said commodity classification code and said parent code through an input device;

an adding portion that adds a record having the commodity classification code and the parent code accepted by said first accepting portion to said first storage as an addition record;

a second accepting portion that accepts information designating one of the other records in said first storage whose parent codes are identical to that of said addition record as a moving-back target record through said input device; and a moving-back portion that replaces the parent code in said moving-back target record with the commodity classification code in said addition record, increments the level number in said moving-back target record by one, and increments the level numbers in the records that define attributes in lower level defining a narrower sense than that in said moving-back target record by one, respectively.

2. The commodity information management program according to claim 1 controlling a computer to be operated as equipment further comprising:

second storage that stores a database including records each of which has commodity information about each kind of a commodity and a commodity code that consists of said commodity classification codes of the commodity in the respective levels; and an updating portion that adds the commodity classification code in said addition record to the records in said second storage whose commodity codes include the parent code in said addition record.

3. A commodity information management program for users to retrieve information of their various commodities, said program controlling a computer to be operated as equipment comprising:

first storage that stores a database for defining various attributes, which form a hierarchical structure, of respective commodities, said database including records each of which has fields of a commodity classification code containing a current attribute, a level number containing a level of the current attribute in said hierarchical structure and a parent code containing a commodity classification code showing a parent attribute in the immediately higher level defining a broader sense than the current attribute;

a first accepting portion that accepts information designating the commodity classification code through an input device;

a deleting portion that deletes the records containing the commodity classification code accepted by said third accepting portion as deletion record from said first storage;

a discriminating portion that discriminates whether there is a moving-up target record in said first storage whose parent code is coincident with the commodity classification code in said deletion record; and a moving-up portion that replaces the parent code in said moving-up target record with the parent code in said deletion record, decrements the level number in said moving-up target record by one, and decrements the level numbers in the records that define attributes in lower level defining a narrower sense than that in said moving-up target record by one, respectively when said discriminating portion discriminated that there is said moving-up target record in said first storage.

4. A computer readable medium that stores a commodity information management program for users to retrieve information of their various commodities, said program controlling a computer to be operated as equipment including:

first storage that stores a database for defining various attributes, which form a hierarchical structure, of respective commodities, said database including records each of which has fields of a commodity classification code containing a current attribute, a level number containing a level of the current attribute in said hierarchical structure and a parent code containing a commodity classification code showing a parent attribute in the immediately higher level defining a broader sense than the current attribute;

a first accepting portion that accepts information designating said commodity classification code and said parent code through an input device;

an addition portion that adds a record recording the commodity classification code and the parent code accepted by said first accepting portion to said first storage as an addition record;

second accepting portion that accepts information designating one of the other records in said first storage whose parent codes are identical to that of said addition record as a moving-back target record through said input device; and a moving-back portion that replaces the parent code in said moving-back target record with the commodity classification code in said addition record, increments the level number in said moving-back target record by one, and increments the level numbers in the records that define attributes in lower level defining a narrower sense than that in said moving-back target record by one, respectively.

* * * * *

UNITED STATES PATENT AND TRADEMARK OFFICE
CERTIFICATE OF CORRECTION

PATENT NO.        : 7,083,091 B2
APPLICATION NO. : 10/785153
DATED             : August 1, 2006
INVENTOR(S)       : Ryuta Ishikawa et al.

It is certified that error appears in the above-identified patent and that said Letters Patent is hereby corrected as shown below:

Column 24, Line 30, insert --a-- before "second."

Signed and Sealed this

Twentieth Day of February, 2007

JON W. DUDAS
*Director of the United States Patent and Trademark Office*